(12) United States Patent
Kaku et al.

(10) Patent No.: US 6,898,256 B2
(45) Date of Patent: May 24, 2005

(54) SYNCHRONIZATION METHOD AND APPARATUS

(75) Inventors: Takashi Kaku, Kawasaki (JP); Takahiro Kurakata, Kawasaki (JP); Hideo Miyazawa, Inagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/319,927

(22) Filed: Dec. 12, 2002

(65) Prior Publication Data

US 2003/0123490 A1 Jul. 3, 2003

Related U.S. Application Data

(63) Continuation of application No. PCT/JP00/08566, filed on Dec. 4, 2000.

(51) Int. Cl.[7] ............................................. H04L 7/00
(52) U.S. Cl. ..................................................... 375/354
(58) Field of Search ................................. 375/354, 355, 375/363, 364, 368, 219, 295, 288, 293

(56) References Cited

U.S. PATENT DOCUMENTS

| | | | | |
|---|---|---|---|---|
| 5,600,634 A | * | 2/1997 | Satoh et al. | 370/294 |
| 5,771,224 A | * | 6/1998 | Seki et al. | 370/206 |
| 6,567,988 B1 | * | 5/2003 | Okawa | 725/127 |

* cited by examiner

*Primary Examiner*—Khai Tran
(74) *Attorney, Agent, or Firm*—Katten Muchin Zavis Rosenman

(57) ABSTRACT

In a synchronization method and apparatus in a data transmission using a transparent transmission line, a periodic amplitude modulation is applied, or a zero-point is inserted, as a synchronizing signal to a transmission signal point on a transmission side at a preceding stage of a transparent transmission line. Also, in case of a frame synchronization, a power value of a received signal is calculated on a reception side of the above-mentioned transparent transmission line and the synchronizing signal is vectorized using the power values whose phases are different from each other by 90 degrees on a time axis.

22 Claims, 22 Drawing Sheets

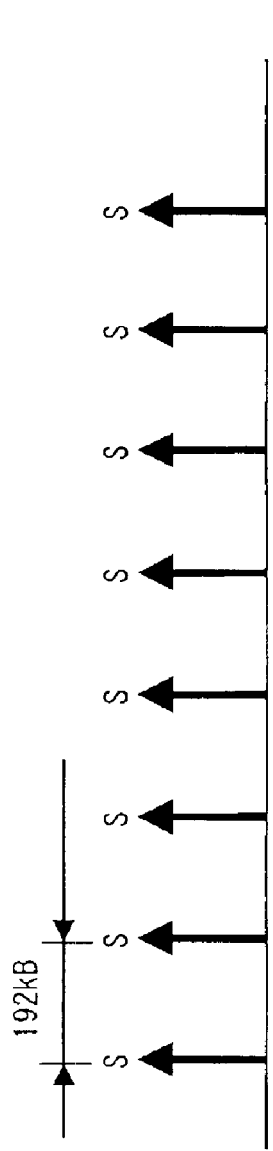
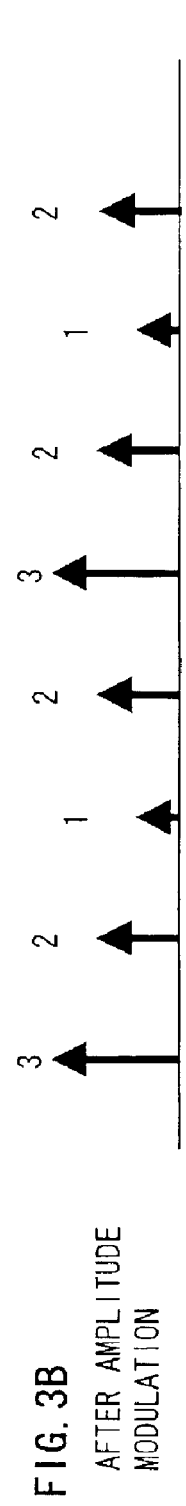
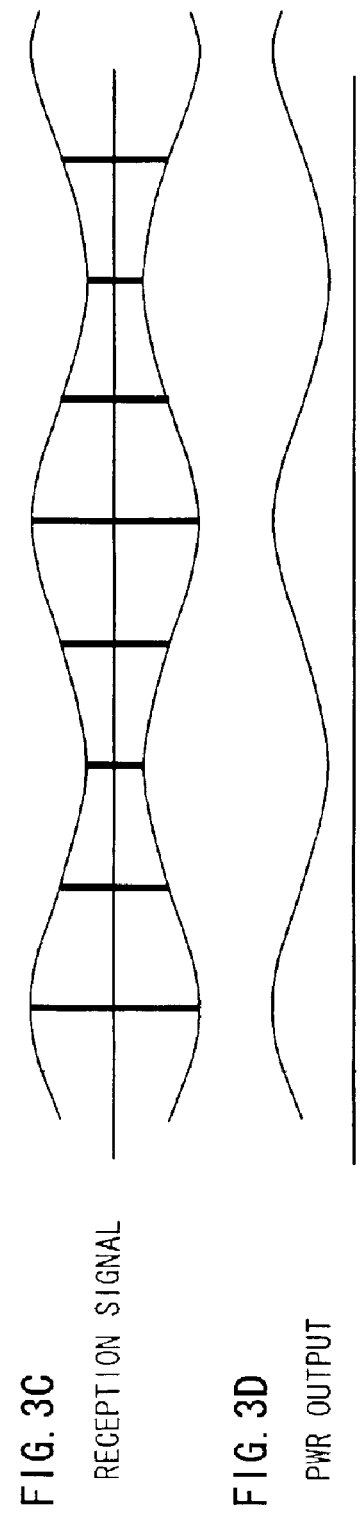
FIG. 3A TRANSMISSION SIGNAL AT SPEED 192kB
FIG. 3B AFTER AMPLITUDE MODULATION
FIG. 3C RECEPTION SIGNAL
FIG. 3D PWR OUTPUT
FIG. 3E BPF OUTPUT

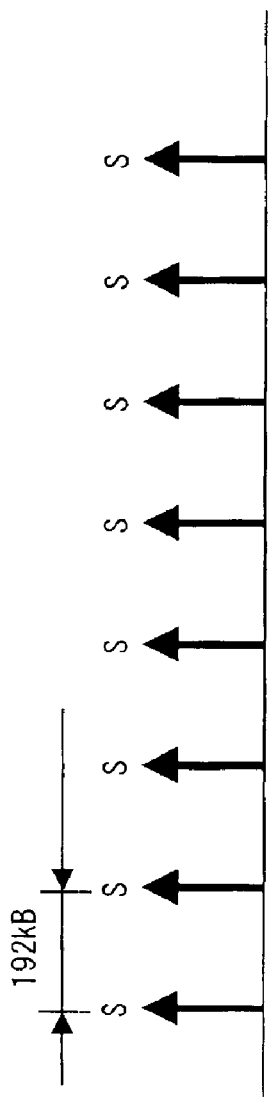
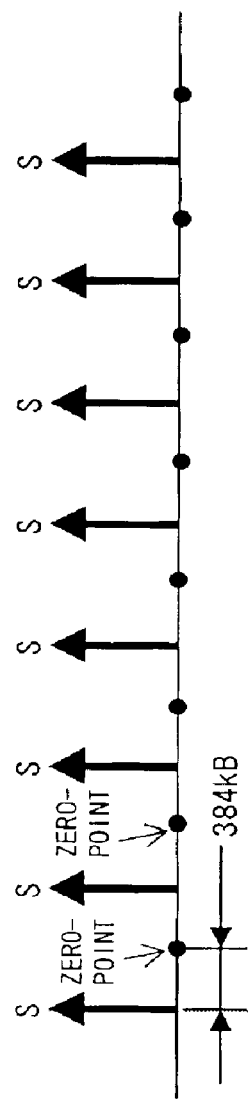
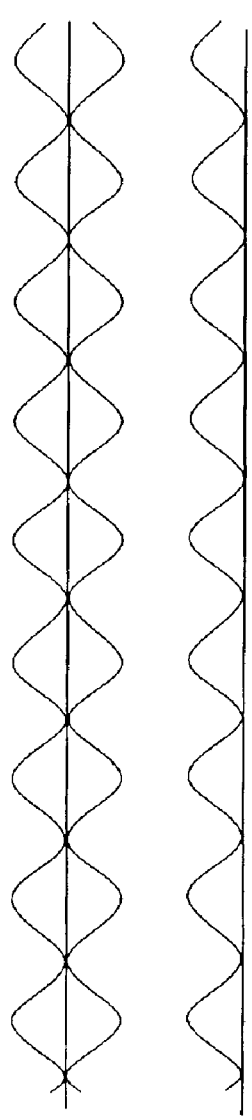
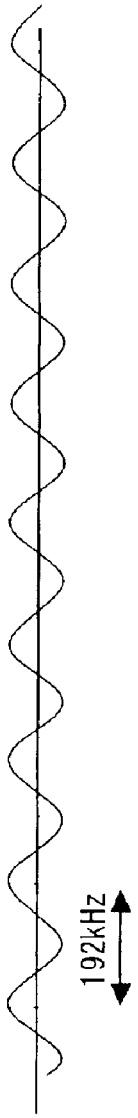
FIG. 5A TRANSMISSION SIGNAL AT SPEED 192kB
FIG. 5B AFTER ZERO-POINT INSERTION
FIG. 5C RECEPTION SIGNAL
FIG. 5D PWR OUTPUT
FIG. 5E BPF OUTPUT

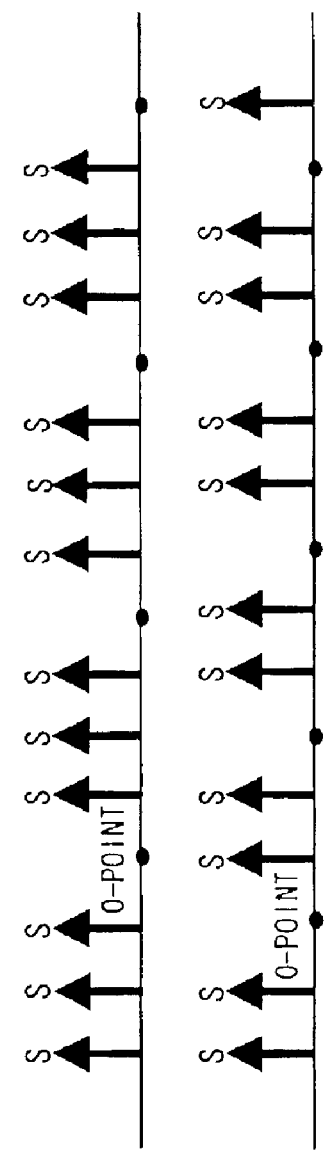

FIG. 6A ZERO-POINT: INSERTED INTO EVERY 4TH SIGNAL POINT
SYNCHRONIZING SIGNAL: 96kHz

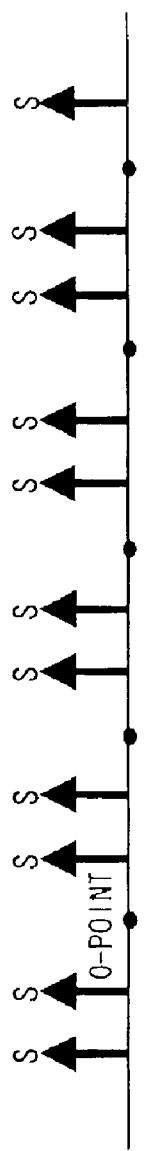

FIG. 6B ZERO-POINT: INSERTED INTO EVERY 3RD SIGNAL POINT
SYNCHRONIZING SIGNAL: 128kHz

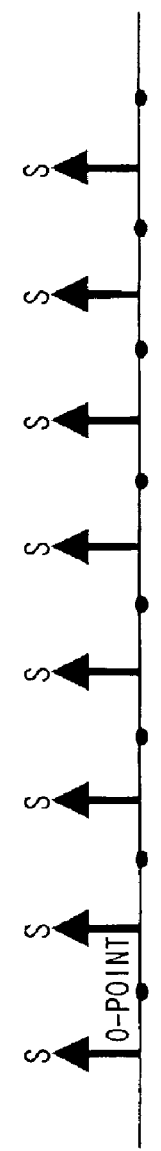

FIG. 6C ZERO-POINT: INSERTED INTO EVERY OTHER SIGNAL POINT
SYNCHRONIZING SIGNAL: 192kHz

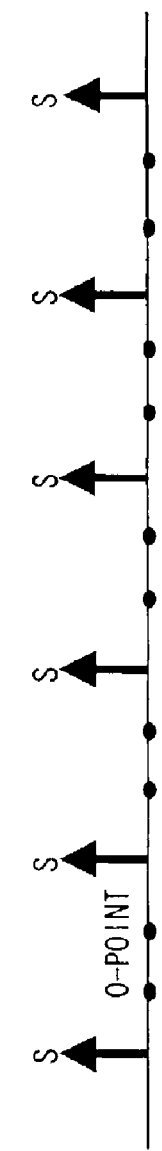

FIG. 6D ZERO-POINT: 2 ZERO-POINTS INSERTED BETWEEN SIGNAL POINTS
SYNCHRONIZING SIGNAL: 128kHz

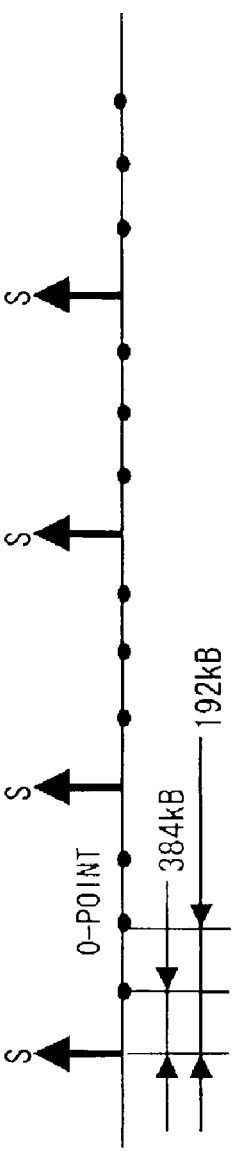

FIG. 6E ZERO-POINT: 3 ZERO-POINTS INSERTED BETWEEN SIGNAL POINTS
SYNCHRONIZING SIGNAL: 96kHz (LINE SPECTRUM IN THE CENTER OF THE PHOTO IS ZERO-POINT SIGNAL OF 192kHz)

FIG. 12A MASTER FRAME (600Hz)

FIG. 12B SUB-FRAME

FIG. 12C TIMING

FIG. 12D MODULATION UNIT

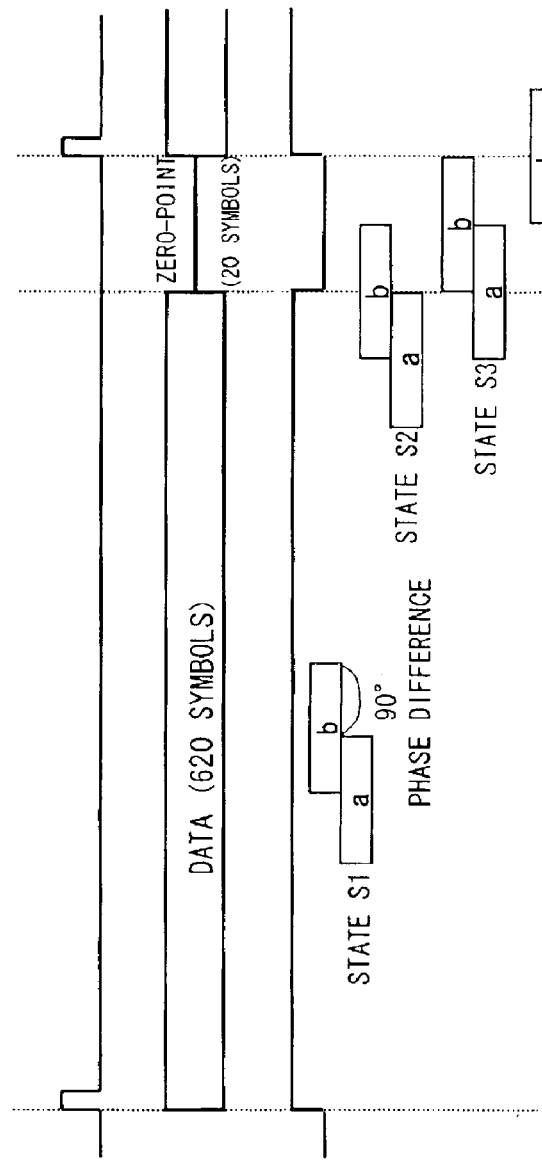
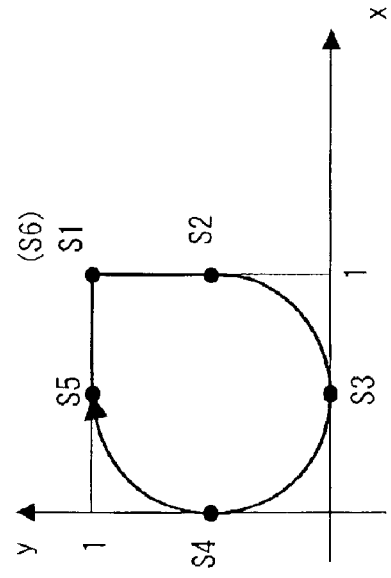
FIG. 16A FRAME 600Hz
FIG. 16B DATA
FIG. 16C POWER
FIG. 16D VECTORIZATION

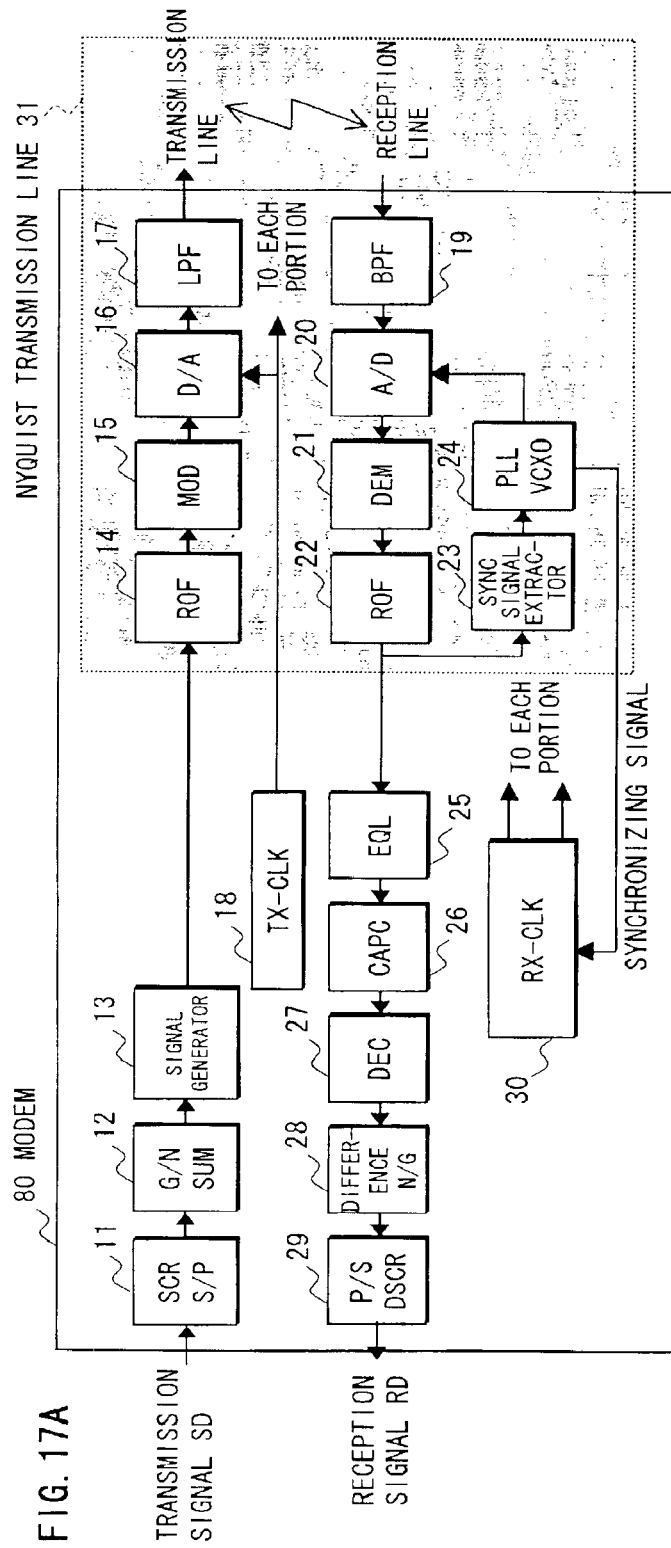
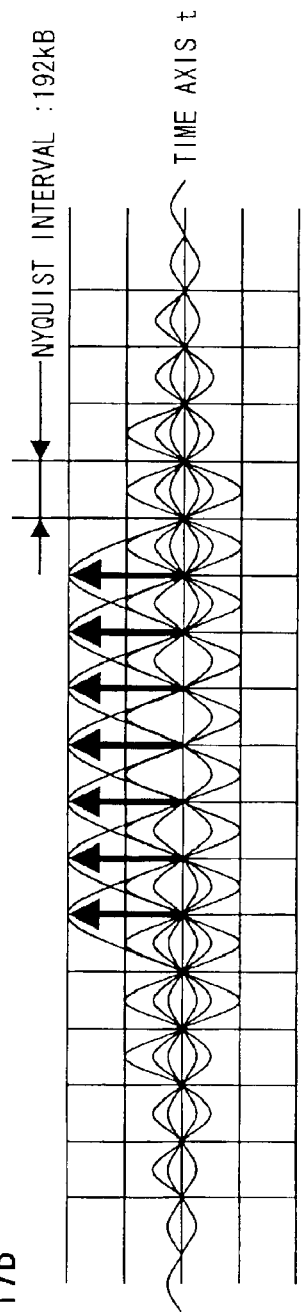
FIG. 17A PRIOR ART
FIG. 17B

BPF OUTPUT

VECTORIZATION

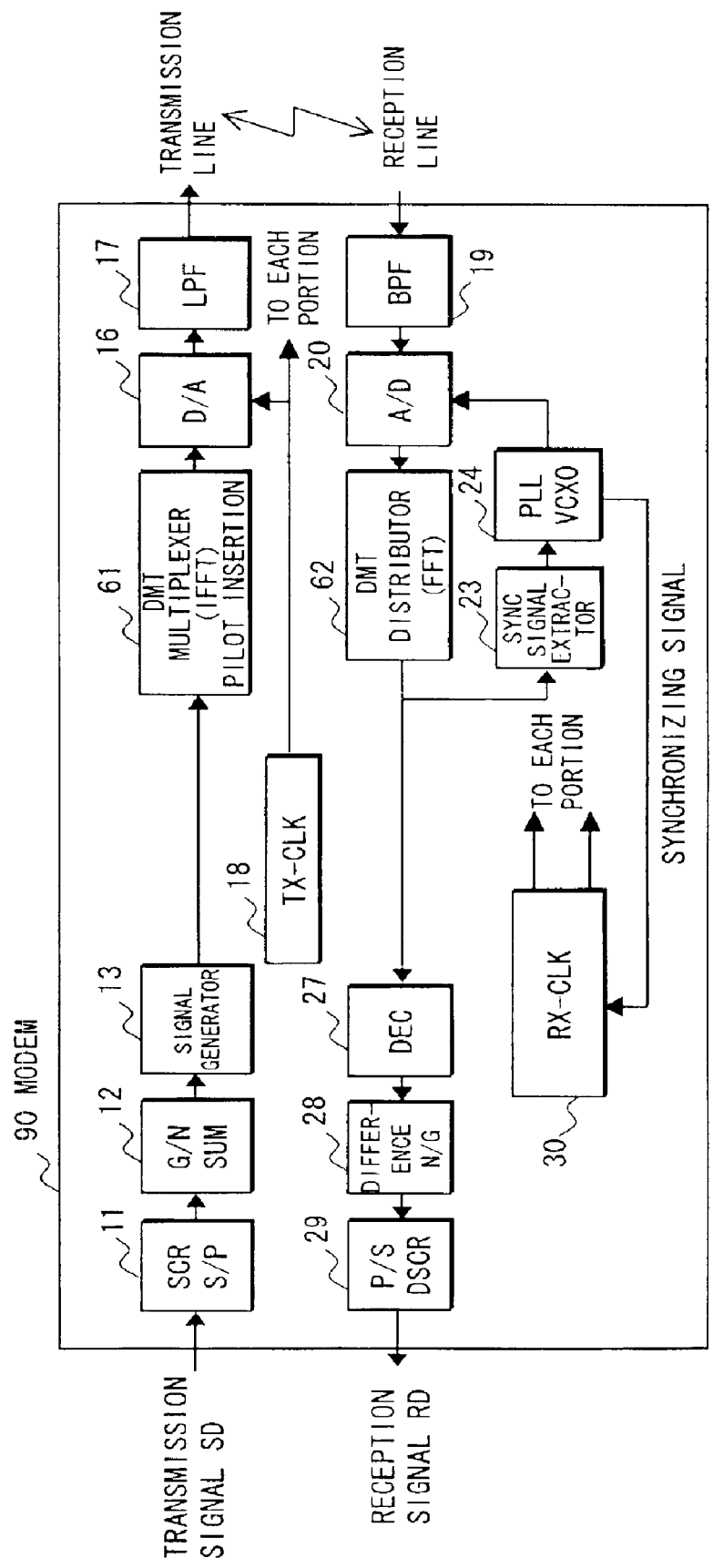

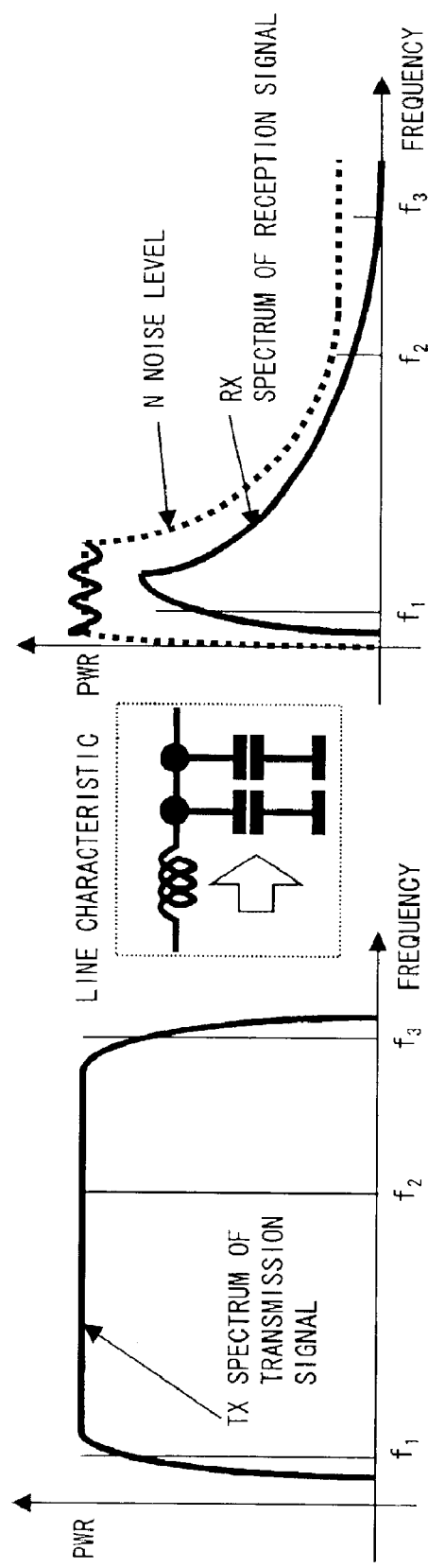

US 6,898,256 B2

SYNCHRONIZATION METHOD AND APPARATUS

This application is a continuation of international application number PCT JP00/08566, filed Dec. 4, 2000, now pending.

BACKGROUND OF THE INVENTION

1. Field of the Invention

The present invention relates to a synchronization method and apparatus, and in particular to a synchronization method and apparatus in a data transmission using a transparent transmission line.

2. Description of the Related Art

In a data transmission, a method for transmitting a synchronizing signal carried on a specific frequency has been known as a synchronizing method of establishing a timing synchronization or a frame synchronization. Also, such a synchronizing method is used in transmission apparatuses such as modems.

First of all, prior art for establishing the timing synchronization and the frame synchronization will be described hereinafter.

(1) Timing Synchronization

The prior art of the timing synchronization includes a QAM (Quadrature Amplitude Modulation) transmission system. In the QAM transmission system, since a data signal is transmitted at a Nyquist interval on a transmission side, it is made possible to establish the timing synchronization on a reception side by extracting Nyquist frequency components by a band-pass filter.

FIG. 17A shows an arrangement of a prior art modem using the QAM transmission system. FIG. 17B shows an example of a transmission signal of this modem.

An operation where this modem is used in, for example, a power-line carrier communication will now be described.

On the transmission side of a modem 10 shown in FIG. 17A, a scramble process is performed to a transmission signal SD by a scrambler (SCR) 11, and a serial signal is converted into a parallel signal. The parallel signal is converted from a Gray code (G) of which the transmission signal is originally formed into a Natural code (N) by a vector sum circuit 12. After a vector sum calculation is performed corresponding to a vector difference circuit 28 for detecting a phase on the reception side, a signal generator 13 transmits the transmission signal.

This transmission signal has its waveform shaped by a roll-off filter (ROF) 14. The output signal of the roll-off filter 14 is modulated by a modulation circuit (MOD) 15 and is further converted from the digital signal into the analog signal by a D/A conversion circuit 16. Then, a low-pass filter (LPF) 17 extracts a signal only in a low frequency band including a frequency band (10 kHz–450 kHz) of a power carrier wave to be transmitted to the line.

When such a transmission signal is received through the reception line, only predetermined frequency band components (10–450 kHz for a power carrier modem) are firstly extracted by a band-pass filter (BPF) 19, and restored to the digital signal by an A/D conversion circuit 20.

The analog signal expressed in the digital form is demodulated into the baseband signal by a demodulation circuit (DEM) 21, and then the waveform is shaped by a roll-off filter 22.

The output of the roll-off filter 22 is sent to a synchronizing (sync) signal extractor 23 and a VCXO type PLL circuit 24, whereby a phase of a synchronizing signal (timing synchronizing signal) is extracted and a sampling timing signal is provided to the A/D converter 20.

An intersymbol interference is removed from the output signal of the roll-off filter 22 by an equalizer (EQL) 25, and a phase adjustment is performed by a carrier automatic phase controller (CAPC) 26, so that a decision circuit (DEC) 27 further outputs only signal components.

A vector difference (error) calculation by the Natural code, opposite to the vector sum circuit 12, is performed by the vector difference circuit 28, and the Natural code is restored to the Gray code, so that the parallel Gray code is converted into a serial signal by a descrambler (DSCR) 29 for the descramble process to be outputted as a reception signal RD.

In addition, a transmission clock generation circuit (TX-CLK) 18 provides a transmission clock to the D/A converter 16, and distributes the same to other portions. Also, on the reception side, a reception clock generation circuit (RX-CLK) 30 extracts the reception clock to be provided to the portions of the receiver.

Also, the hatched portion of FIG. 17A corresponds to a Nyquist transmission line 31 that is transparent. FIG. 17B shows an example of a transmission signal in case the signal generator 13 generates a transmission signal at 192 kB. In this case, the Nyquist interval of the Nyquist transmission line 31 assumes 192 kB.

FIG. 18 specifically shows the synchronizing signal extractor 23 and the VCXO type PLL circuit 24 shown in FIG. 17A.

The synchronizing signal extractor 23 is composed of a power calculator (PWR) 231, a band-pass filter 232, and a vectorizing circuit 233. The PLL circuit 24 is composed of a comparator 241, a low-pass filter 242, a secondary PLL circuit 243, a D/A conversion circuit 244, a VCXO (Voltage Controlled Crystal Oscillator) circuit 245, and a frequency divider 246.

Namely, the vector signal outputted from the roll-off filter 22 is squared by the power calculator 231 to calculate the power. The power value thus obtained is passed through the band-pass filter 232. Since the band-pass filter having the Nyquist frequency 192 kHz as the center frequency is used in this example, the synchronizing signal of the Nyquist frequency is outputted to the vectorizing circuit 233.

"Vectorization" will now be described referring to FIGS. 19A and 19B. In FIG. 19A, while a solid line shows a waveform of the input signal (192 kHz) for the vecrorizing circuit 233, and a dashed line shows a waveform where a phase of this input signal is shifted by 90 degrees.

In FIG. 19A, supposing the amplitude is "1", values of the input signal and the signal whose phase is shifted therefrom by 90 degrees at each of points A, B, C, and D are (1, 0), (0, −1), (−1, 0), and (0, 1), respectively. Being plotted on xy coordinates, they rotate along a circle shown in FIG. 19B in the order of A→B→C→D. Therefore, it is seen that the input signal of scalar value is vectorized by the signal whose phase is shifted therefrom by 90 degrees.

Describing FIGS. 19A and 19B together with FIG. 18, the output of the vectorizing circuit 233 is provided to the PLL circuit 24 as timing phase information.

In the PLL circuit 24, the timing phase information from the vectorizing circuit 233 is firstly compared with the phase of a reference point preknown at the comparator 241. When there is a phase difference due to a transmission line delay, a point which should be located inherently at e.g. the point A in FIG. 19B is shifted to a position of a point X. In this case, a phase difference θ between the points A and X is detected by the comparator 241 and passed through the low-pass filter 242.

Since the low-pass filter 242 extracts only the low band component, high frequency variations in the phase difference θ caused by the noise are removed. With the phase difference θ thus obtained, the controlled voltage of the VCXO 245 is controlled by the secondary PLL circuit 243 composed of two integrators and the D/A conversion circuit 244. After performing the frequency division at the frequency divider 246, the phase information is fed back to the comparator 241 to be compared with the phase at the reference point.

Thus, the phase difference θ between the timing phase information from the vectorizing circuit 233 and the reference point is pulled in or nullified, thereby enabling the extraction of the synchronizing signal whose synchronization is established. Also, the sample timing signal to the A/D converter 16 is outputted from the VCXO circuit 245, and is finally fed back to the comparator 241 to form a phase locked loop.

(2) Frame Synchronization

The prior art of the frame synchronization includes a DMT (Discrete MultiTone) system, or an OFDM (Orthogonal Frequency Division Multiplexing) system. In the DMT system/OFDM system, a specific frequency is allocated to a pilot signal, and the frame synchronization is established on the reception side by extracting the pilot signal.

FIG. 20 shows a modem using the DMT system/OFDM system. The difference between the arrangements of a modem 90 shown in FIG. 20 and the modem 80 shown in FIG. 17A is that the modem 90 is provided with a DMT multiplexer 61 instead of the role-off filter 14 and the modulation circuit 15 on the transmission side of the modem 80. Also, the modem 90 is provided with a DMT distributor 62 instead of the demodulation circuit 21 and the role-off filter 22 on the reception side of the modem 80.

It is to be noted that the DMT multiplexer 61 composes a frame (master frame) by multiplexing the transmission signals (DMT signals for a predetermined channel number) transmitted from the signal generator 13 with an inverse fast Fourier transform (IFFT), thereby inserting a pilot signal into a specific frequency. Also, the DMT distributor 62 demultiplexes the reception signal with a fast Fourier transform (FFT) to extract the frame.

As for the synchronizing signal extractor 23 and the VCXO type PLL circuit 24 in FIG. 20, those having the same arrangement as that in FIG. 18 may be used. However, the band-pass filter 232 has a frequency of the pilot signal as its center frequency. Also, the power calculator 231 is made unnecessary in this case.

Systems such as the QAM system and the DMT system/OFDM system where the synchronizing signal is carried on a specific frequency for the transmission are effective when the transmission of the specific frequency is guaranteed. However, supposing a power-line carrier communication, for example, since a power line cannot guarantee the transmission of the specific frequency greatly influenced by noises, the establishment of synchronization has been difficult.

This is because the power line exhibits an extremely complicated line characteristic. This will be described referring to FIGS. 21 and 22A–22C.

In a power system shown in FIG. 21, power in a distribution substation 100 is firstly supplied to a pole transformer 103 through a 6.6 KV high voltage distribution line 102, and is further supplied to a home 105 through a 100 V/200 V low voltage distribution line 104.

Upon performing a power-line carrier communication, an optical fiber (not shown) is set up parallel with the high voltage distribution line 102 between an access node 101 in the distribution substation 100 and a modem set up in the pole transformer. Through the optical fiber, the communication between the modem in the pole transformer 103 and the modem inserted into the convenience outlet connected to an interior distribution line 106 in the home 105 is performed through the 100 V/200 V low voltage distribution line 104.

In this case, as shown in FIGS. 22A–22C, the low voltage distribution line 104 appears to be an inductor of 1 µH/m, as shown in FIG. 22B, for a spectrum of a transmission signal TX shown in FIG. 22A, and appears to be an inductor of 150 µH if the line length is assumed to be 150 m.

Also, a service wire 107 connected to the low voltage distribution line 104 appears to be a capacitor of 75 pF/m, and appears to be a capacitor of 0.1125 µF if a 50 m service wire is assumed to be connected to the home 105. Not only the service wire, but also various household electric appliances in the home 105 appear to be a capacitive load (see FIG. 22B), since the capacitors for canceling the noise are connected to AC 100 V.

Consequently, the portion between the utility pole where the pole transformer 103 is placed and the convenience outlets in the home appears to be a low-pass filter (LPF), as shown in FIG. 22B, and a reception signal RX greatly attenuates in a high frequency band, as shown in FIG. 22C. Therefore, when arriving at the terminal side, the high frequency band signal is buried in a noise N in the worst case.

On the other hand, although the loss in the low frequency band is not so large compared with the high frequency band, noises from the household electric appliances such as inverter appliances are extremely high. Therefore, the received signal is also buried in the noise N as shown in FIG. 22C.

Supposing the Nyquist frequencies of the above-mentioned QAM transmission system are frequencies $f_1$ and $f_3$, and the pilot frequency of the DMT system/OFDM system is a frequency $f_2$, the transmission of these frequencies in the power-line carrier communication is not guaranteed as shown in FIG. 22C. Therefore, establishment of synchronization using such a specific frequency has been difficult.

SUMMARY OF THE INVENTION

It is accordingly an object of the present invention to provide a synchronization method and apparatus where a synchronization is established on the reception side even in case transmission of a specific frequency is not guaranteed.

In order to achieve the above-mentioned object, a synchronizing signal has only to be transmitted by being carried not on a specific frequency but on the entire band. Namely, the synchronizing signal has only to be carried on a time axis.

Therefore, the present invention is characterized in that a synchronizing signal is generated by applying a periodic amplitude modulation to a transmission signal point on a transmission side at a preliminary stage of a transparent transmission line.

Namely, a periodic amplitude modulation is applied to a transmission signal point on a transmission side at a preliminary stage of a transparent transmission line so that this periodic amplitude modulation is transmitted as a synchronizing signal. Thus, it is made possible to transmit the synchronizing signal on a time axis without using a specific frequency as in the prior art QAM system or DMT/OFDM system.

The synchronizing signal generated by the above-mentioned amplitude modulation may be a timing synchronizing signal or a frame synchronizing signal. In the latter case, the above-mentioned amplitude modulation may be performed in a period which is an integral multiple of a single frame interval of the transmission signal. Also, the above-mentioned amplitude modulation may be applied after having separated frames into relatively long and short sections.

Also, a power ratio of the above-mentioned amplitude modulation may comprise an integral ratio. Namely, the power ratio may be an integral ratio such as (3,2,1,2,3,2,1 , , , ). Also, the integral ratio may include "0" like (1,0,1,0 , , , ) or (2,0,2,0 , , , ).

Thus, the power ratio of the amplitude modulation changes periodically, and the periodic change assumes the synchronizing signal, so that the synchronizing signal is transmitted on a time axis.

Also, in the present invention, a synchronizing signal may be generated by periodically inserting a zero-point into a transmission signal point on a transmission side at a preliminary stage of a transparent transmission line.

Namely, a synchronizing signal is transmitted by periodically inserting a zero-point into a transmission signal point on a transmission side at a preliminary stage of a transparent transmission line. This, as in the above, equivalently corresponds to a case where a 100% amplitude modulation is applied, thereby enabling the transmission of the synchronizing signal on a time axis.

As for the above-mentioned zero-point, one or more zero-points may be inserted at intervals of signal points of an integer number. Namely, one or more zero-points may be inserted after every two signal points or three signal points, as well as between two signal points.

The synchronizing signal generated by the above-mentioned zero-point insertion may be a timing synchronizing signal or a frame synchronizing signal. In the latter case, the above-mentioned zero-point insertion may be performed per frame frequency of the transmission signal.

It is to be noted that in the above description, a reception side is not mentioned in particular. This is because the reception side has only to extract the synchronizing signal and pull in the phase in the same way as the prior art described referring to FIG. 18.

Namely, in the present invention, a power value of a received signal in which the synchronizing signal is transmitted on a time axis may be calculated on the reception side of the above-mentioned transparent transmission line. Since the power value periodically changes according to the synchronizing signal, the synchronizing signal included in the received signal may be extracted.

Thus, it is made possible to establish the synchronization in the same way as the prior art by using the extracted synchronizing signal.

While the timing synchronization is assumed in the above-mentioned processing on the reception side, when the frame synchronization is assumed, the frame frequency of the transmission signal usually becomes extremely low compared with a modulation speed. For example, if the modulation speed is 384 kB, when the timing synchronizing signal is e.g. 192 kB in case of the timing synchronization, the speed ratio of the modulation speed to the synchronizing signal is 2:1. However, when the frequency of the master frame is e.g. 600 Hz in case of the frame synchronization, the ratio assumes 640:1.

FIGS. 1A and 1B show a difference between a pull-in phase space (resolution) in the timing synchronization and that in the frame synchronization. FIGS. 1A and 1B show vectorized synchronizing signals respectively in the timing synchronization and the frame synchronization.

In FIG. 1A, one cycle of A→B→C→D→A indicates, as having been shown in FIG. 19B, one period of the timing synchronizing signal. When the ratio of the modulation speed to the synchronizing signal is 2:1, the pull-in phase space corresponds to 180 degrees, that is ½ of 360 degrees. Namely, the phase difference θ observed from 384 kB appears within ±90 degrees.

However, as shown in FIG. 1B, since the speed ratio is 640:1 in case of the frame synchronization, for one period of the frame synchronizing signal indicated by one cycle of A→B→C→D→A, the pull-in phase space observed from 384 kB becomes 1/640 of 360 degrees.

Thus, in case of the frame synchronization, when the synchronizing signal corresponding to the frequency (600 Hz) of the master frame is extracted by the above-mentioned method to establish the synchronization in the same way as the prior art, since the phase difference θ between the phase information of the synchronizing signal and the reference point appears only in a very small quantity, so that a stable establishment of synchronization is difficult.

This is because in case of the frame synchronization where the frequency of the synchronizing signal is extremely low compared with the modulation speed, the pull-in phase space of the synchronizing signal becomes extremely narrow as mentioned above. In such a case, the pull-in space of the synchronizing signal has only to be relatively expanded so as to make the phase difference from the reference point obvious.

Therefore, in the present invention, when the synchronizing signal is either a frame synchronizing signal generated by applying the amplitude modulation after separating frames into relatively long and short sections or a frame synchronizing signal generated by inserting zero-points, a technique is applied where a power value of a received signal is calculated on the reception side of the above-mentioned transparent transmission line, and the synchronizing signal is vectorized using the power values whose phases are different from each other by 90 degrees on a time axis.

Namely, the phase information of the synchronizing signal is obtained not by extracting the synchronizing signal from the periodic change of the power value of the received signal as mentioned above, but by calculating the power value of the received signal, and by vectorizing the synchronizing signal using the power values whose phases are different from each other by 90 degrees on a time axis.

In this case, in the relatively long section within the frame, the power values whose phases are different from each other by 90 degrees show the same value, and the values change on both sides of the relatively short section immediately preceding or succeeding the frame where the amplitude modulation or the zero-point insertion is applied.

In the prior art vectorization, while the speed is constant for rotation of A→B→C→D→A shown in FIG. 1B, when the power value itself of the received signal is vectorized, a vector retained at a certain point for A→B→C→D→X and rotated for a section only around X→A (see FIG. 19 described later).

This means that the pull-in phase space shown in FIG. 1B is expanded. Thus, it is made possible to expand the pull-in phase space of the synchronizing signal, thereby realizing a stabler synchronization.

Also, before the above-mentioned calculation of the power value of the received signal, cos roll-off filtering may be applied to the received signal.

Thus, as in e.g. a power-line carrier communication, it is made possible to cut a low band component where noises are predominant and a high band component where S/N ratio is deteriorated, thereby realizing a stabler synchronization.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 3A–3E are diagrams illustrating a schematic operation of an embodiment (1);

FIGS. 5A–5E are diagrams illustrating a schematic operation of an embodiment (2);

FIGS. 6A–6E are diagrams showing various states of zero-point insertion by the present invention;

FIGS. 16A–16D are diagrams for illustrating a schematic operation of FIG. 15;

FIGS. 17A and 17B are block diagrams showing a modem to which a prior art QAM system is applied;

FIG. 20 is block diagram of a modem to which a prior art DMT/OFDM system is applied;

FIGS. 22A–22C are diagrams (No.2) for illustrating prior art problems.

DESCRIPTION OF THE EMBODIMENTS

Embodiment (1)

Figure 2A:
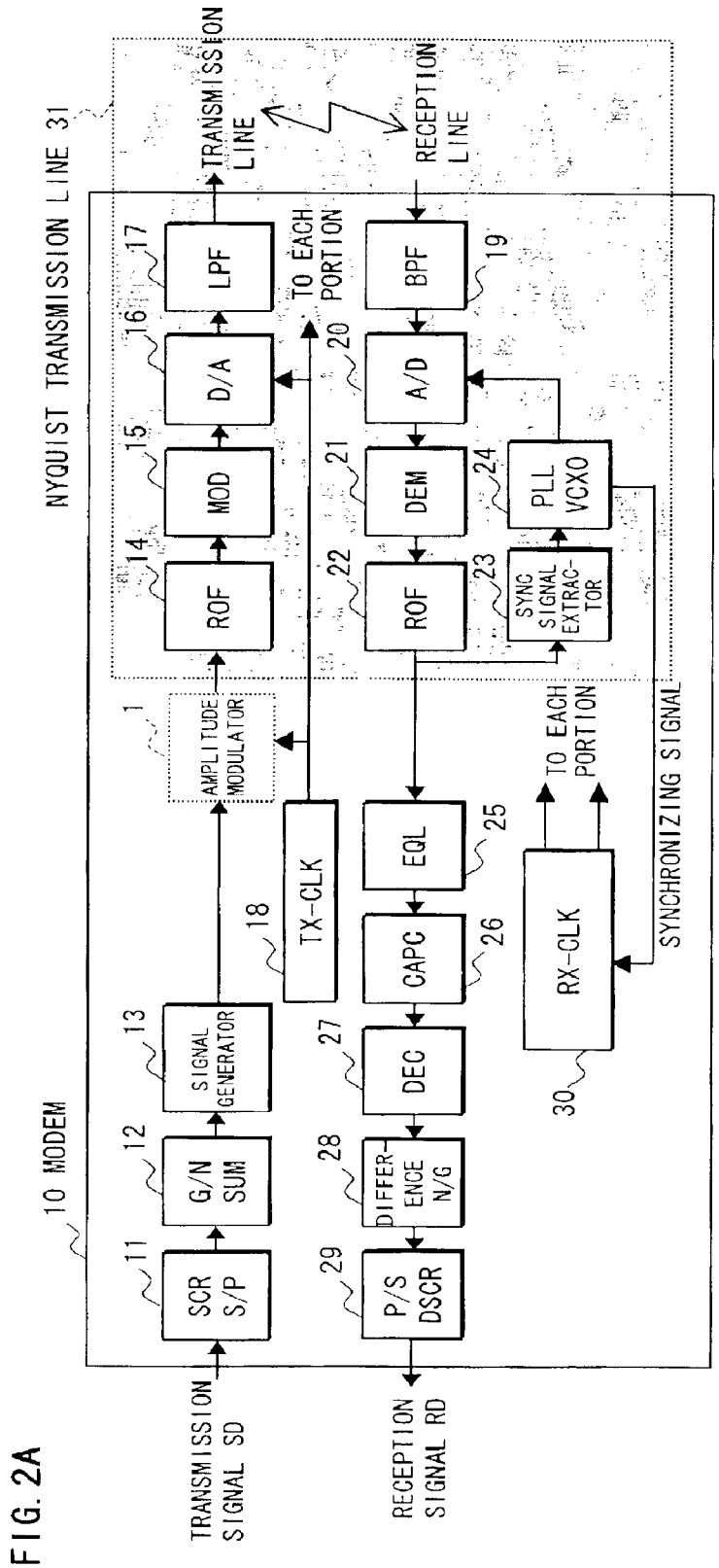
FIGS. 2A and 2B are block diagrams showing an embodiment (1) where a synchronization method and apparatus according to the present invention are applied to a modem.
Figure 2B:
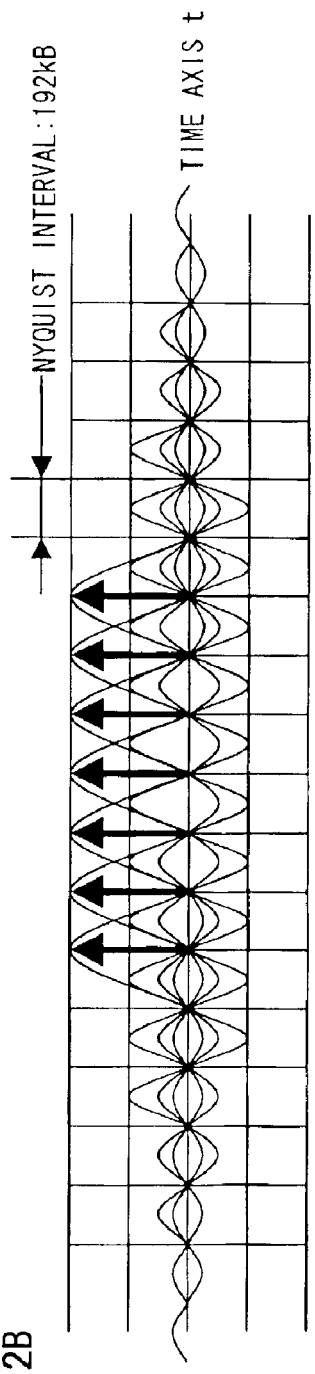

FIGS. 2A and 2B show an arrangement of a modem 10 where a synchronization method and apparatus according to the present invention are used. The modem 10 is provided with an amplitude modulator 1 for applying amplitude modulation to a signal generated by a signal generator 13 on the transmission side in addition to the arrangement similar to that of the modem 80 shown in FIG. 17 to which the prior art QAM transmission system is applied. It is to be noted that the specific arrangements of a synchronizing signal extractor 23 and a VCXO type PLL circuit 24 on the reception side in FIG. 2A may be the same as those shown in FIG. 18.

Referring to FIGS. 2A and 2B, the operation of this embodiment will be described taking an example of a case where the signal generator generates the transmission signal at the Nyquist interval of 192 kB as in FIGS. 17A and 17B. It is to be noted that the amplitude modulator 1 is assumed to apply amplitude modulation to the transmission signal points by an integral ratio (3,2,1,2,3,,,) as an operation example.

FIGS. 3A and 3B respectively show examples of the signal generated by the signal generator 13 and the transmission signal after the amplitude modulation. As shown in FIGS. 3A and 3B, a single period of the amplitude modulation becomes the period of the synchronizing signal, so that the synchronizing signal assumes 192/4=48 kHz.

Figure 18:
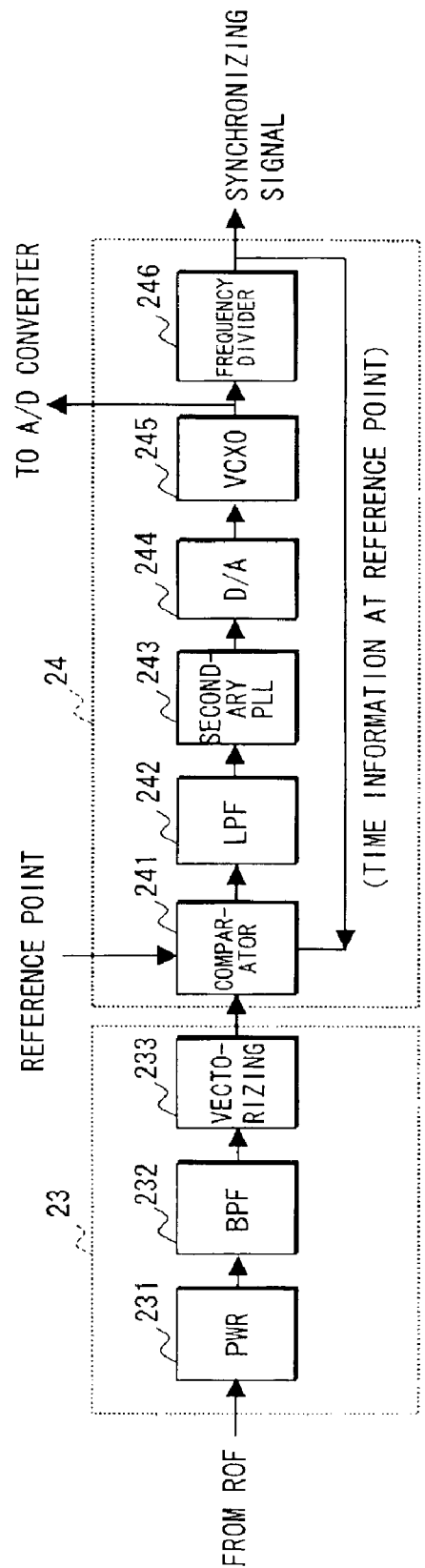
FIG. 18 is a block diagram showing a specific arrangement of a synchronizing signal extractor and a VCXO type PLL circuit of FIG. 17A.

On the reception side in FIG. 2A, the synchronizing signal is extracted by performing the same processing on the reception signal as the prior art QAM transmission system modem having been described referring to FIG. 18. However, this embodiment is different from the prior art in that the center frequency of the band-pass filter 232 is 48 kHz, that is the frequency of the synchronizing signal.

FIGS. 3C–3E respectively show waveforms of the reception signal (input signal of the power calculator 231), the output signal of the power calculator 231, and the output signal of the band-pass filter 232.

Figure 19A:
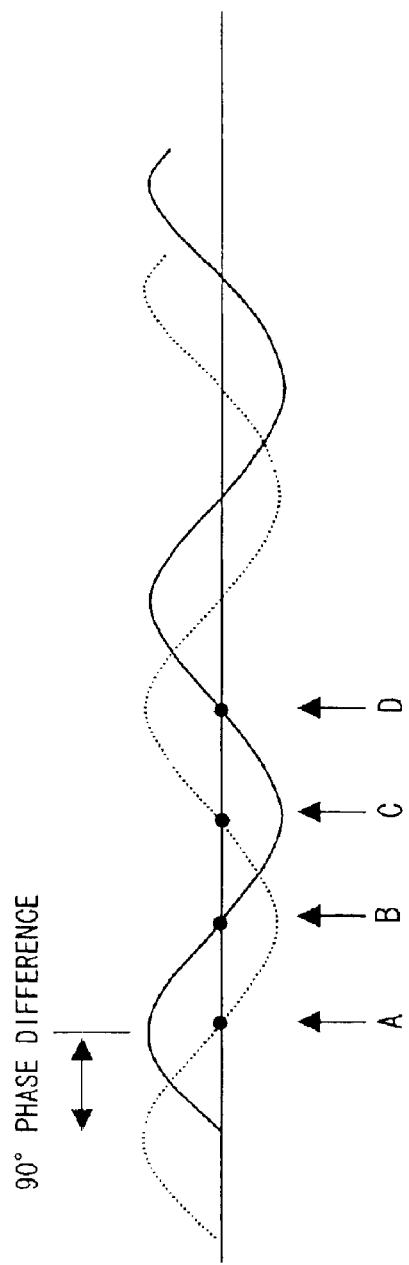
FIGS. 19A and 19B are diagrams for illustrating a vectorization of a synchronizing signal.
Figure 19B:
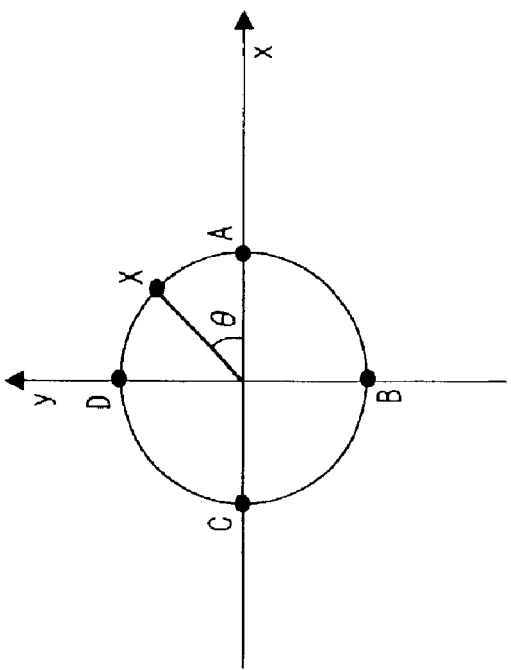
Figure 21:
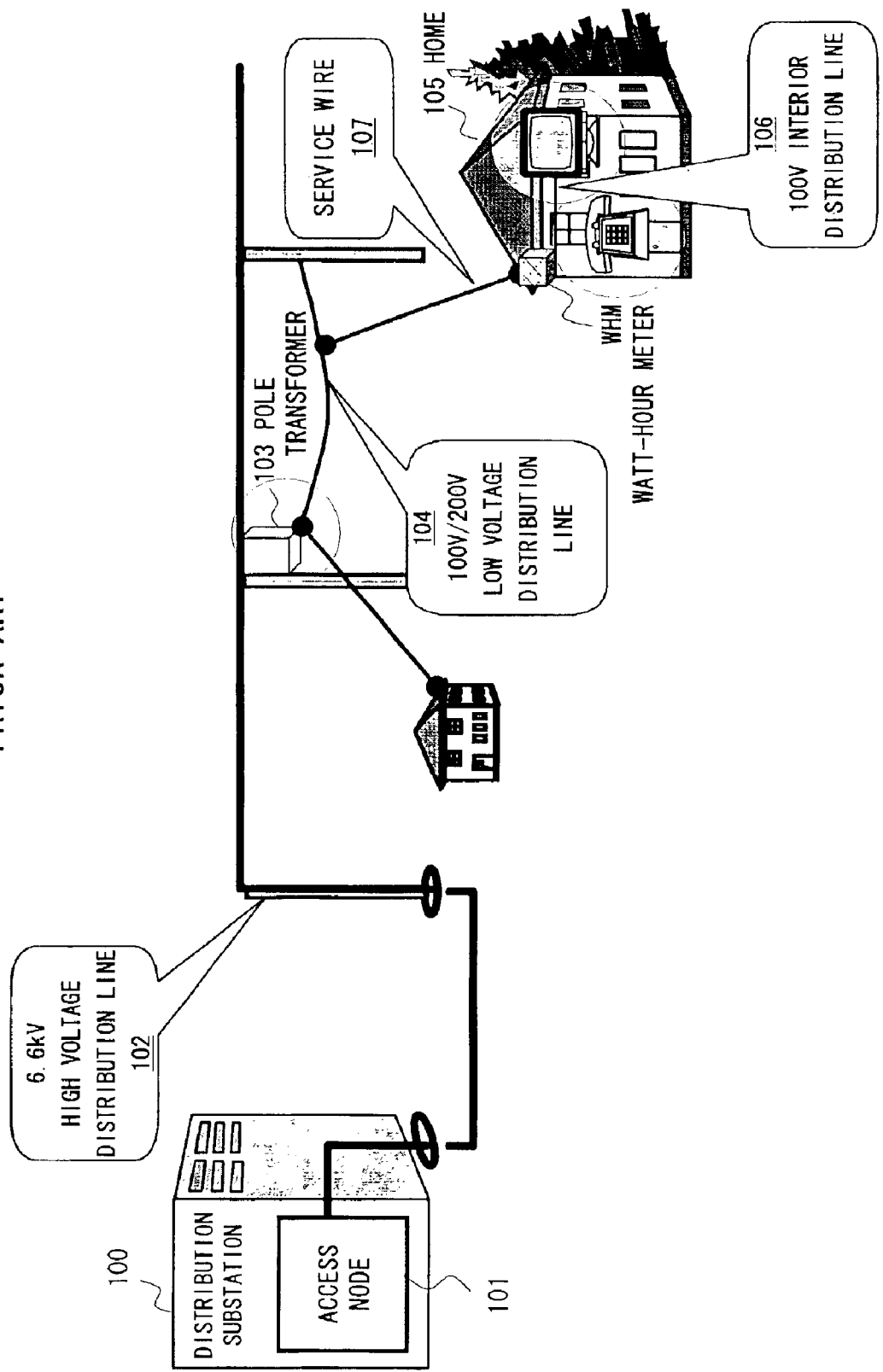
FIG. 21 is a diagram (No.1) for illustrating prior art problems.

Thus, the synchronizing signal shown in FIG. 3E can be extracted by the band-pass filter 232, so that it is made possible, as having been described in FIGS. 18, 19A, and 19B, to pull in the phase difference θ from the reference point by comparing the output of the vectorizing circuit 233 with a preknown reference point at the comparator 241.

Embodiment (2)

Figure 4A:
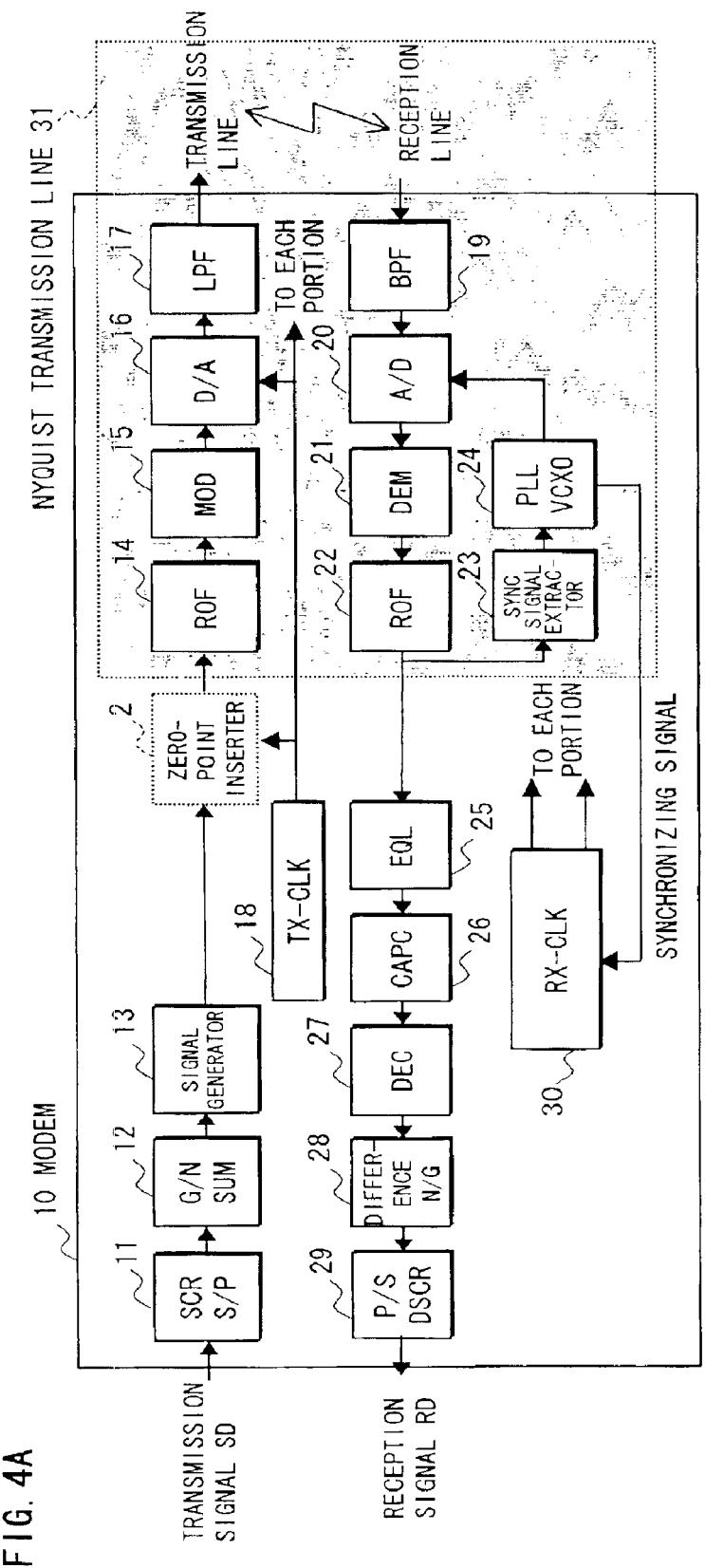
FIGS. 4A and 4B are block diagrams showing an embodiment (2) where a synchronization method and apparatus according to the present invention are applied to a modem.
Figure 4B:
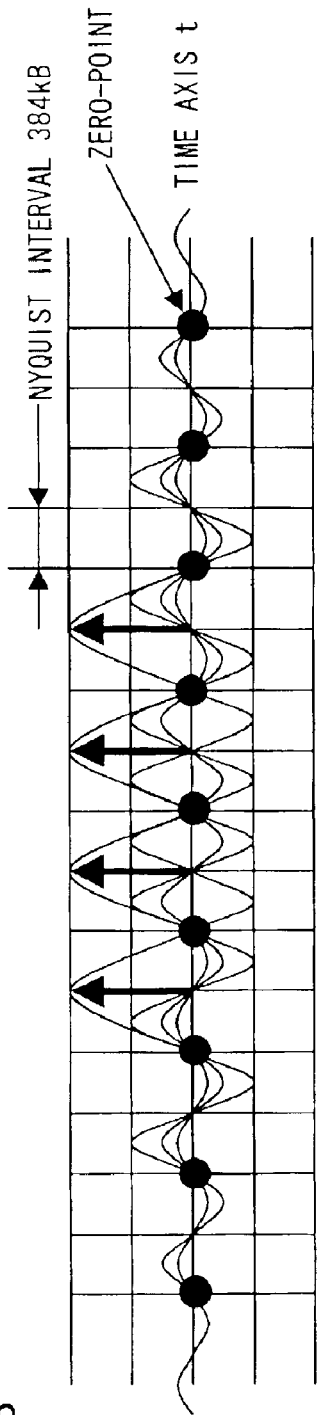

FIGS. 4A and 4B show another arrangement of a modem 10 using the method and apparatus for synchronization according to the present invention. The modem 10 in FIG. 4A is provided with a zero-point inserter 2, instead of the amplitude modulator 1 of FIG. 2A, for inserting zero-points into the signal generated by the signal generator 13 on the transmission side.

Also in this embodiment, the specific arrangements of the synchronizing signal extractor 23 and the VCXO type PLL circuit 24 on the reception side may be the same as those of the prior art shown in FIG. 18.

The operation of this embodiment will be described taking an example of a case where the signal generator 13 generates the transmission signal at the Nyquist interval of 192 kB in FIG. 4A in the same way as in FIG. 17. It is to be noted that as an operation example, the zero-point inserter 2 inserts a single zero-point between the transmission signal points.

FIGS. 5A and 5B respectively show the examples of the signal generated by the signal generator 13 and the transmission signal after the zero-point insertion. As shown in FIGS. 5A and 5B, the transmission band expands from 192 kHz to 384 kHz by the zero-point insertion. In this case, the frequency of the synchronizing signal assumes 192 kHz since the interval of the zero-point insertion is 192 kB.

On the reception side of FIG. 4A, the synchronizing signal is extracted by performing the processing of the reception signal in the same way as in FIG. 18. Although the Nyquist frequency is made 384 kB by the zero-point insertion on the transmission side, the frequency of the synchronizing signal, 192 kHz is used for the center frequency of the band-pass filter 232 in this embodiment, which is different from the prior art QAM transmission system modem having the center frequency of the Nyquist frequency, 384 kHz.

FIGS. 5C–5D respectively show waveforms of the reception signal (input signal of the power calculator 231), the output signal of the power calculator 231, and the output signal of the band-pass filter 232. As seen from FIG. 5C, the zero-point insertion is equivalent to the 100% amplitude modulation being applied.

Thus, the synchronizing signal can be extracted by the band-pass filter 232, so that the establishment of synchronization is made possible in the same way as the embodiment (1) by using this synchronizing signal.

While in the above-mentioned FIGS. 4A–4B and 5A–5E, a case where one zero-point is inserted between the signal points has been mentioned, FIGS. 6A–6E show various patterns of the zero-point insertion.

Namely, FIG. 6A shows the case where the zero-points are inserted into every 4th signal S, whereby the synchronizing signal band assumes 96 kHz.

Also, FIG. 6B shows a case where the zero-points are inserted into every 3rd signal S, whereby the synchronizing signal band assumes 128 kHz.

FIG. 6C shows a case where the zero-points are inserted into every other signal in the same way as the above-mentioned example, whereby the synchronizing signal band assumes 192 kHz.

FIG. 6D shows an example in which two zero-points are inserted between the signals S, whereby the synchronizing signal band assumes 128 kHz.

Furthermore, FIG. 6E shows an example in which three zero-points are inserted between signals S, whereby the synchronizing signal band assumes 96 kHz.

Thus, the frequency of the synchronizing signal can be adjusted by the pattern of the zero-point insertion, and it is made possible to extract the synchronizing signal by extracting the center frequency according to the pattern of the zero-point insertion at the band-pass filter 232 on the reception side.

Figure 7:
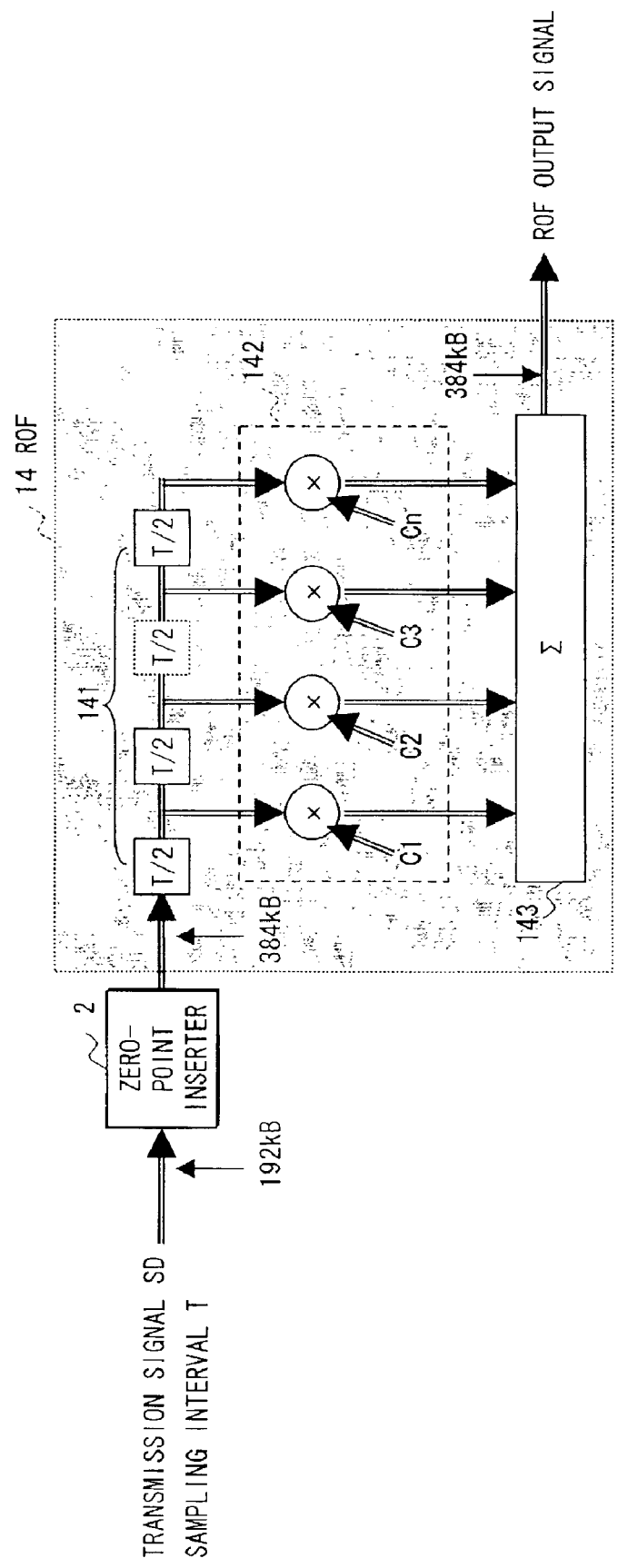
FIG. 7 is a block diagram showing an arrangement of a roll-off filter used in FIG. 4A.

FIG. 7 shows an embodiment of the role-off filter 14 shown in FIG. 4A. The role-off filter 14 can be composed of transversal filters, by arranging a delay circuit portion 141, filter coefficients C1–Cn of a multiplier 142, and an adder 143.

It is to be noted that the transmission signal provided to the zero-point inserter 2 at the sampling interval T (192 kB) has its signal band expanded to 384 kB due to the zero-point insertion, and becomes an input signal of the role-off filter 14.

Figure 8:
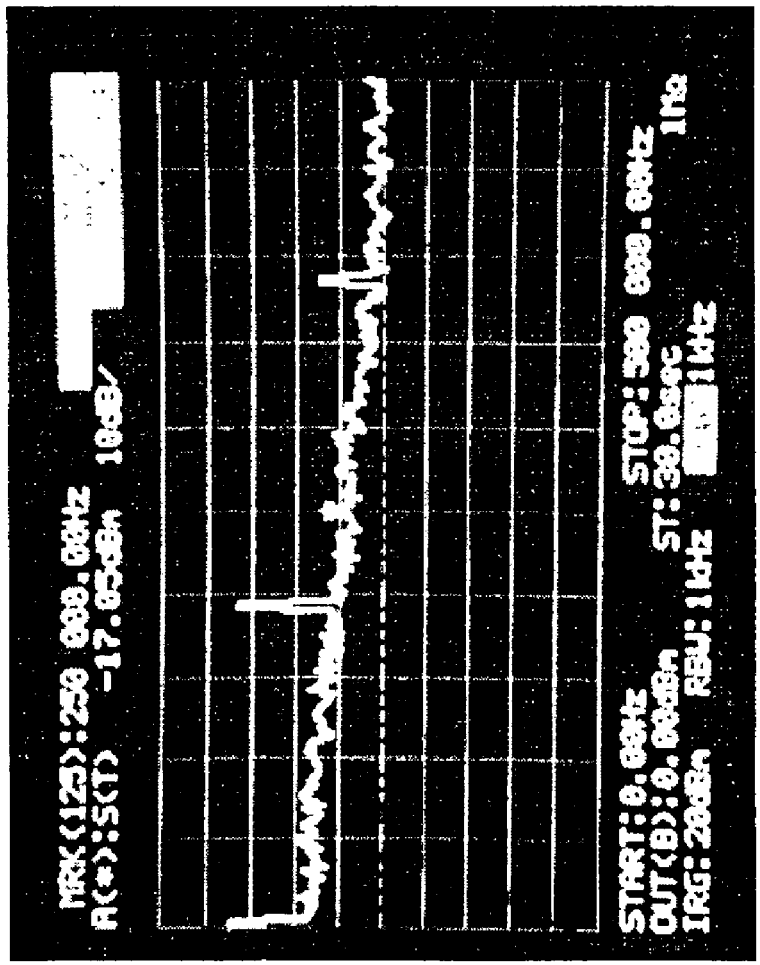
FIG. 8 is a monitored waveform diagram of a synchronizing signal extractor used in the present invention.

FIG. 8 is a photograph showing a spectrum at a time when the vector signal outputted from the roll-off filter 22 on the reception side of this embodiment is squared by the power calculator 231 to calculate the power. The line spectrum in the center of the photograph indicates the synchronizing signal of 192 kHz. Namely, since the zero-point is periodically transmitted on the transmission side, the energy for this section is zero, whereas it becomes possible to extract the power spectrum according to the insertion degree of the zero-point.

Embodiment (3)

Figure 9:
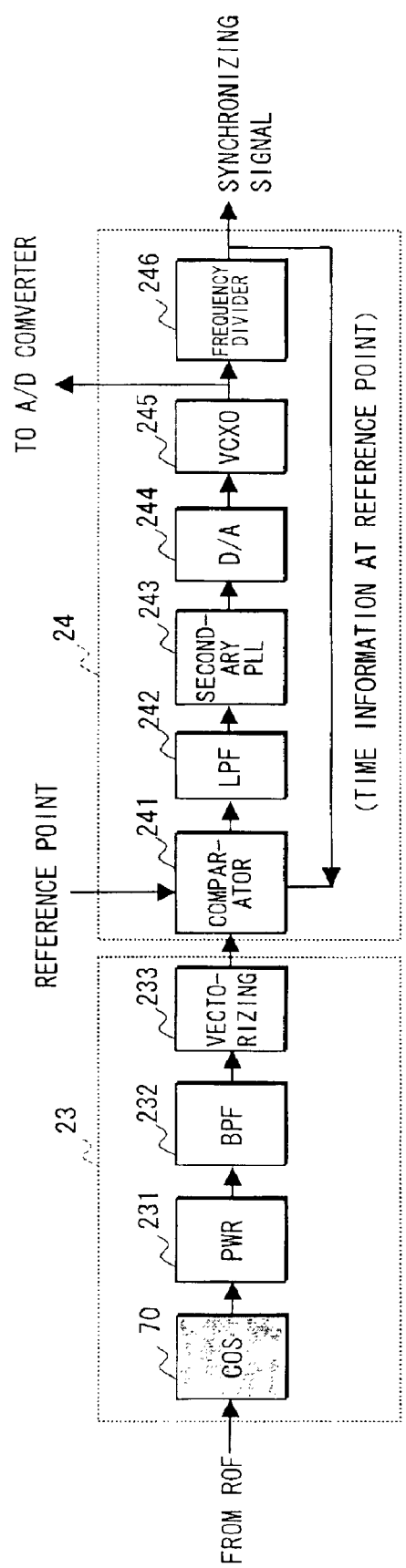
FIG. 9 is a block diagram showing an embodiment of a synchronizing signal extractor and a VCXO type PLL circuit used in the present invention.

FIG. 9 shows another embodiment of the synchronizing signal extractor and the VCXO type PLL circuit used in the present invention. In addition to the arrangement of FIG. 18, the synchronizing signal extractor 23 in FIG. 9 is provided with a cos role-off filter 70 inserted prior to the power calculator 231.

Figure 10:
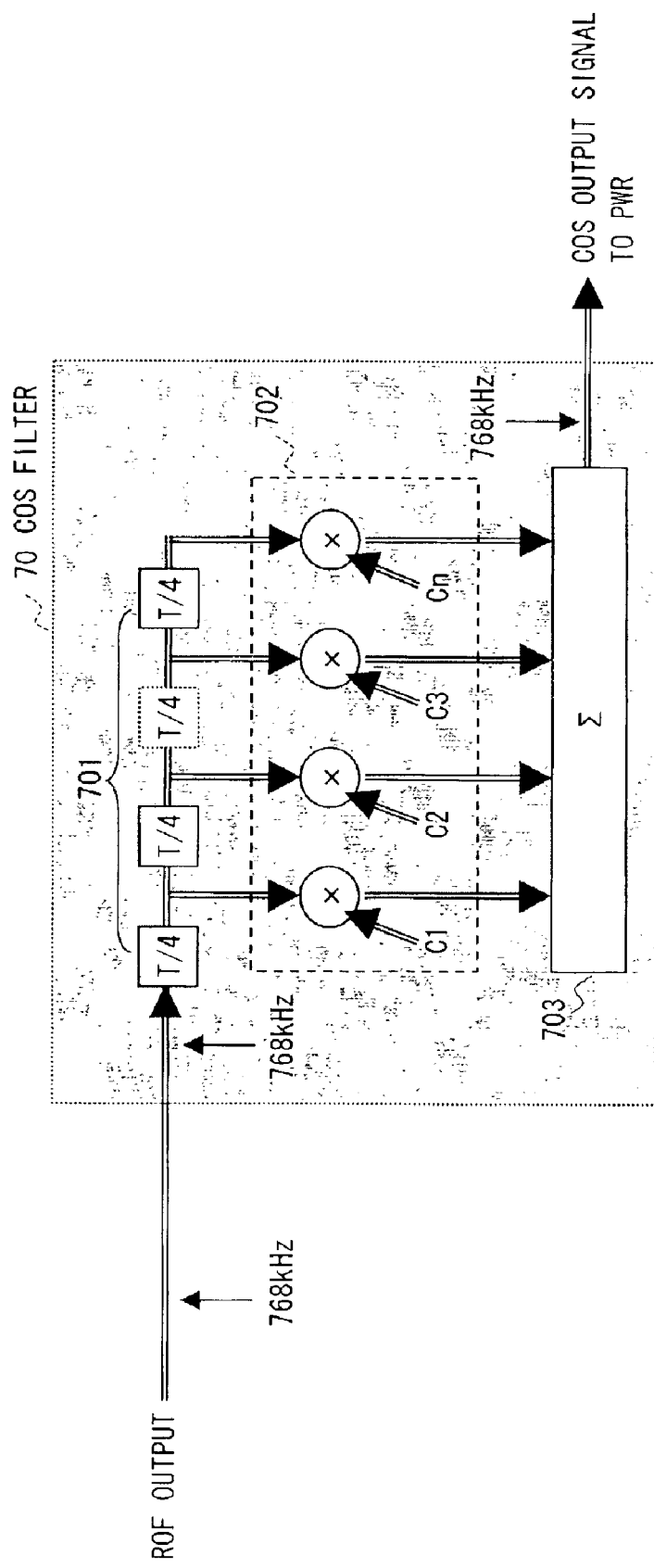
FIG. 10 is a diagram showing an arrangement of a cos roll-off filter used in FIG. 9.

The cos role-off filter 70 can be composed of transversal filters, as shown in FIG. 10, in the same way as the roll-off filter 14 on the transmission side shown in FIG. 7, by arranging a delay circuit portion 701, filter coefficients C1–Cn of a multiplier 702, and an adder 703.

When the zero-points are inserted at 192 kB intervals on the transmission side, a twice sampling frequency or more is required. In practice, for the purpose of facilitating the processing, the sampling frequency is usually set to four times as high, so that in FIG. 10, the output of the roll-off filter 22 is calculated at 768 kHz.

Figure 11:
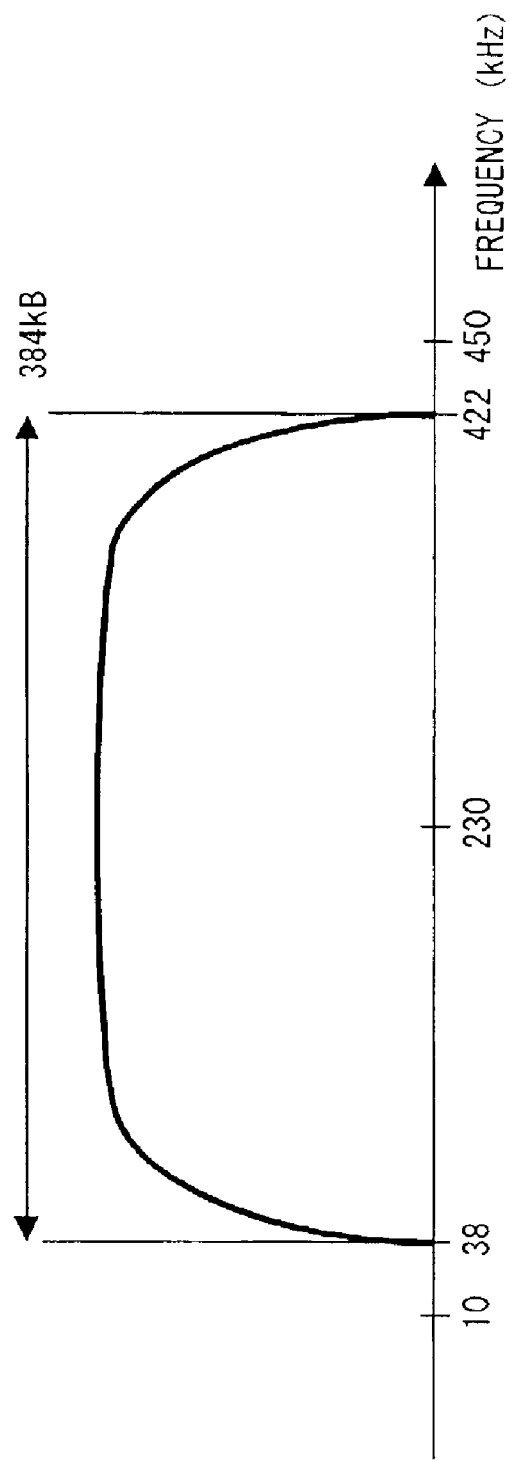
FIG. 11 is a diagram showing a characteristic of a cos roll-off filter of FIG. 10.

FIG. 11 shows an example of filter characteristics of the cos role-off filter 70 shown in FIG. 10. In this example, a component of the low band below 38 kHz and the high band above 422 kHz are filtered out in the power-line carrier communication of 10 kHz–450 kHz. By using such a cos role-of filter, it is made possible to cut the components of the low band with excessive noises and the high band where S/N ratio is deteriorated, thereby enabling a stable synchronizing signal extraction.

In the above-mentioned embodiments (1)–(3), the timing synchronization has been described. Hereinafter, the frame synchronization will be described in embodiments (4) and (5).

As a precondition, modulation units in the frame synchronization will be first described referring to FIGS. 12A–12D. In case of the frame synchronization, if a system processes a master frame including sub-frames, there are a master frame synchronizing signal shown in FIG. 12A, a sub-frame synchronizing signal shown in FIG. 12B, and a timing synchronizing signal shown in FIG. 12C.

Figure 12:
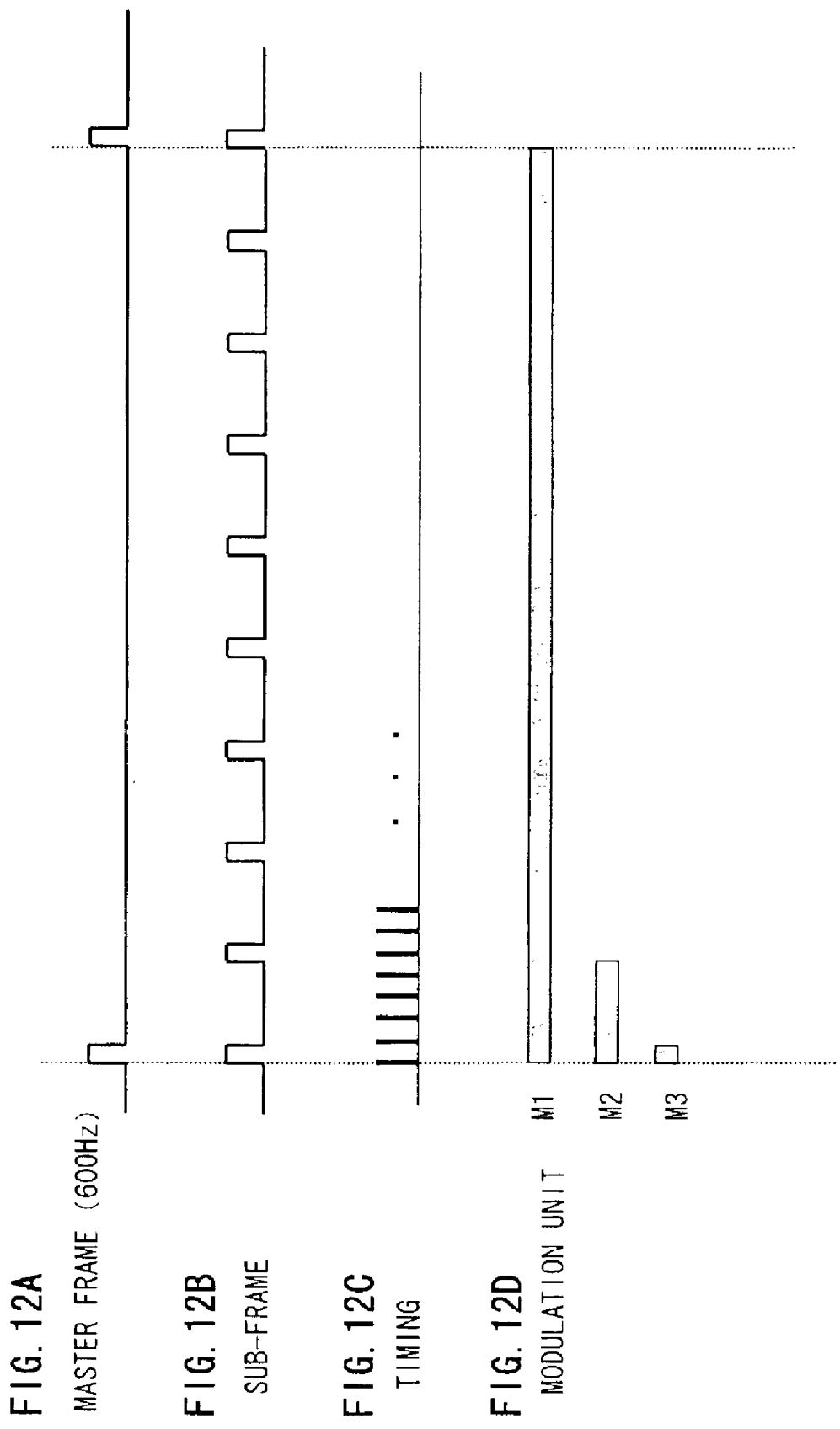
FIGS. 12A–12D are diagrams for illustrating a modulation unit of a frame synchronization in the present invention.

In this case, modulation units M1–M3 shown in FIG. 12D can be considered as those for modulating the master frame.

In case of the frame synchronization, various cases can be considered depending on systems, such as a system including only a master frame, a system where a master frame includes sub-frames, and a system where a sub-frame further includes second and third sub-frames.

For example, when only the master frame is present, only M1 or M3 can be used as the modulation unit. When using M1, two of the master frames are required.

Also, when the master frame includes the sub-frames, the modulation unit M2 corresponding to the sub-frame may also be used.

It is to be noted that while the terms "master frame" and "sub-frame" are used for the convenience sake of description in the following embodiments, the frame synchronization in the present invention can be applied to both of the master frame synchronization and the sub-frame synchronization, so that it is not necessary to distinguish between the two.

Embodiment (4)

Figure 13:
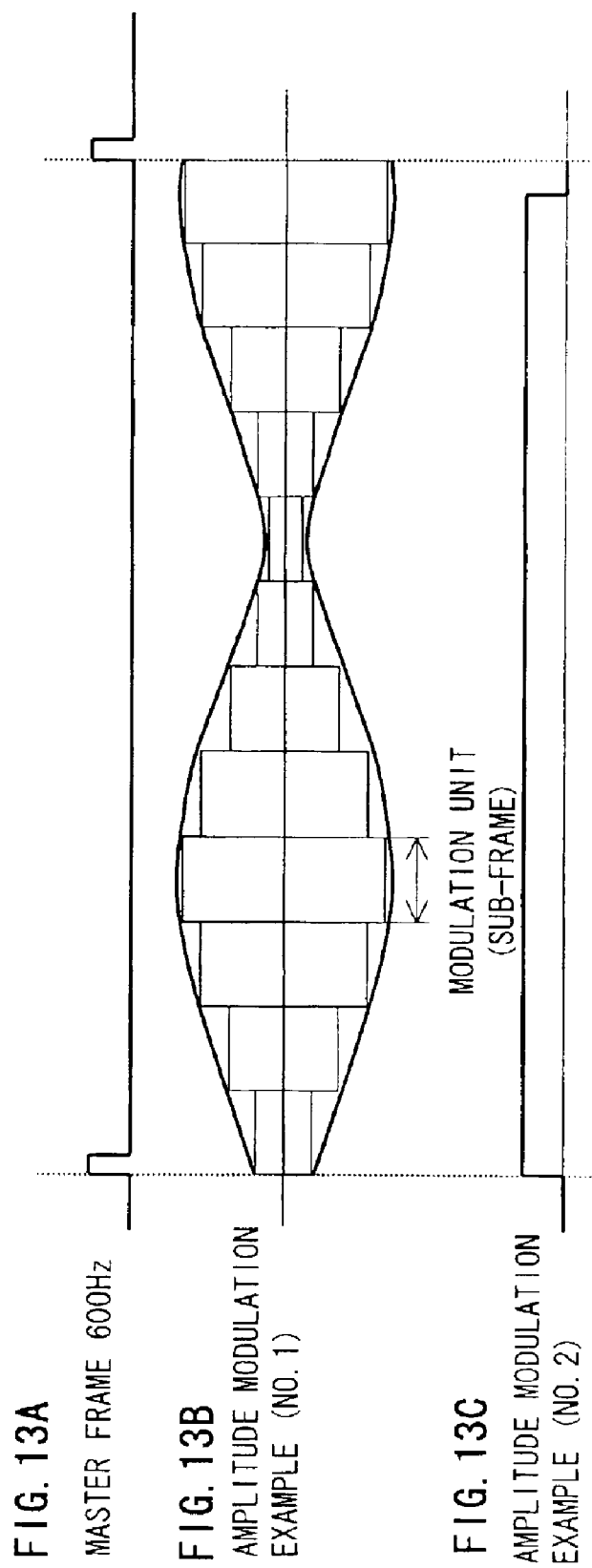
FIGS. 13A–13C are diagrams showing amplitude modulation examples when the present invention is used in frame synchronization.

FIGS. 13A–13C show examples of amplitude modulation of the transmission signal when the present invention is used for the frame synchronization. In the presence of a master frame synchronizing signal as shown in FIG. 13A, the amplitude modulation of the transmission signal can be made the amplitude modulation using the sub-frame shown in FIG. 13B as the modulation unit (amplitude modulation example (No.1)).

The modem for performing such amplitude modulation may have the same arrangement as FIG. 2A. As having already described, in case of such a frame synchronization, although the phase difference between the phase information of the synchronizing signal and the reference point only appears in a very small quantity so that a stable establishment of synchronization is difficult, the establishment of synchronization is possible by extracting the phase difference θ in the same way as in the embodiment (1).

Also, as shown in FIG. 13C, it is possible to apply the amplitude modulation to only the last portion of the master frame (amplitude modulation example (No.2)). FIG. 13C shows an example where the 100% amplitude modulation is applied, which is equivalent to the zero-point insertion described later in the embodiment (5).

Not only by the 100% modulation, but also by the amplitude modulation to only the last portion of the master frame, a stabler synchronization can be established by providing the arrangement on the reception side same as that of the embodiment (5).

Embodiment (5)

Figure 14:
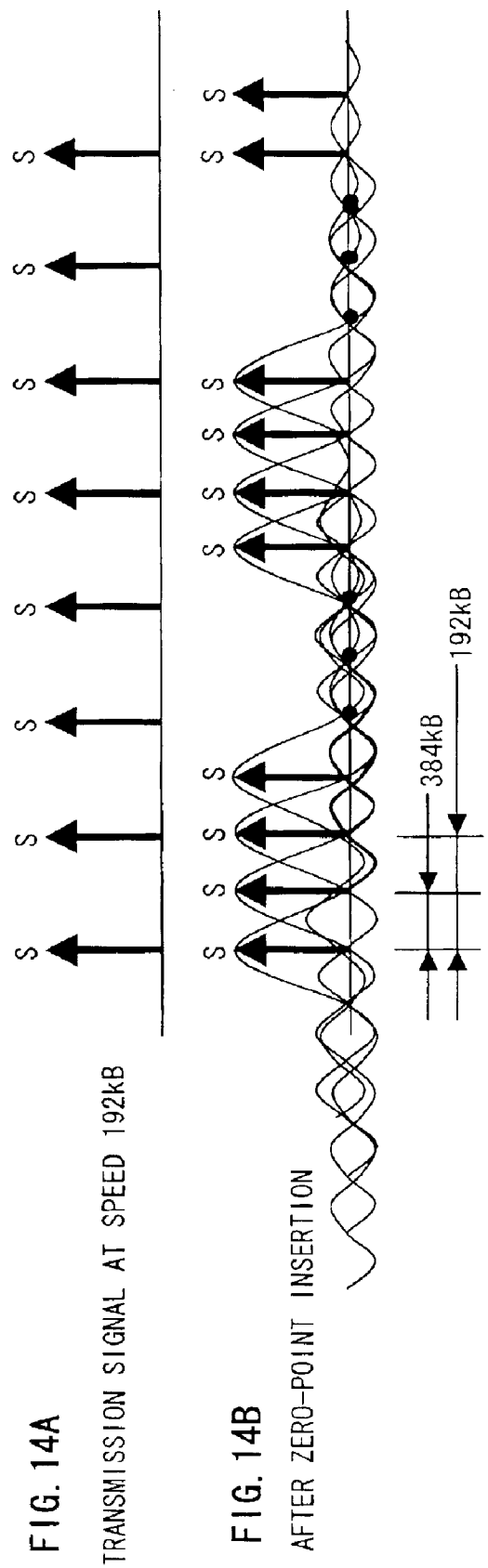
FIGS. 14A and 14B are diagrams showing zero-point insertion examples when the present invention is used in a frame synchronization.

FIGS. 14A and 14B show examples of zero-point insertion when the present invention is used for the frame synchronization.

FIG. 14A shows the signal transmitted at 192 kB, and FIG. 14B shows an example of inserting three zero-points per frame. It is to be noted that while only four signal points of the frame are shown in FIG. 14B, actually, in case the frame frequency is 600 Hz, assuming that the sampling frequency is 384 kHz, for example, 20 zero-points are inserted for 620 signal points.

The modem performing such a zero-point insertion may have the same arrangement as that of FIG. 4A.

Figure 15:
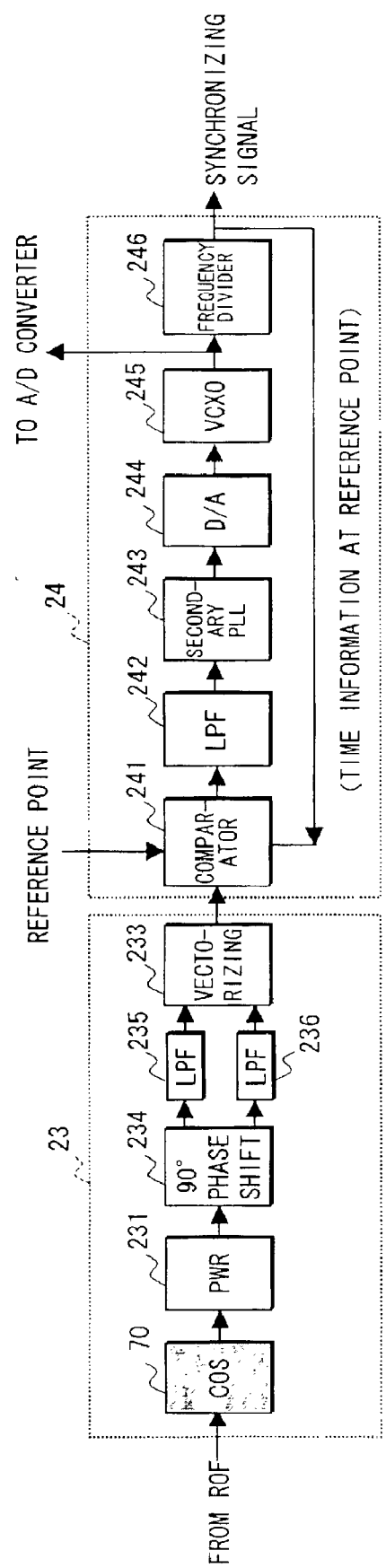
FIG. 15 is a block diagram showing an embodiment of a synchronizing signal extractor and a VCXO type PLL circuit when the present invention is used in a frame synchronization.

FIG. 15 shows embodiments of the synchronizing signal extractor and the VCXO type PLL circuit having resolved the above-mentioned problems in case of the frame synchronization.

The synchronizing signal extractor 23 in FIG. 15 is provided with a 90° phase shifter 234 and two low-pass filters (LPF) 235 and 236 instead of the band-pass filter 232 of the synchronizing signal extractor 23 shown in FIG. 9.

Figure 1B:
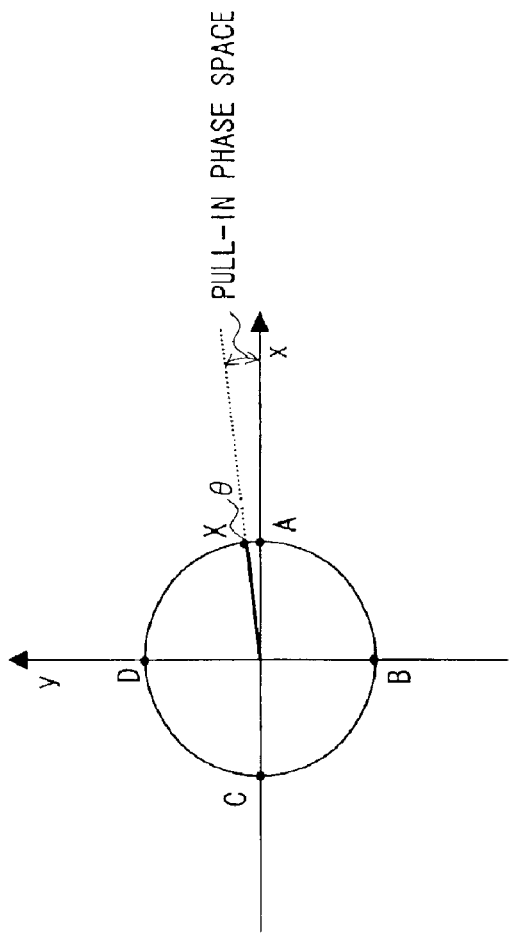
FIGS. 1A and 1B are diagrams for illustrating a pull-in phase space.
Figure 1A:
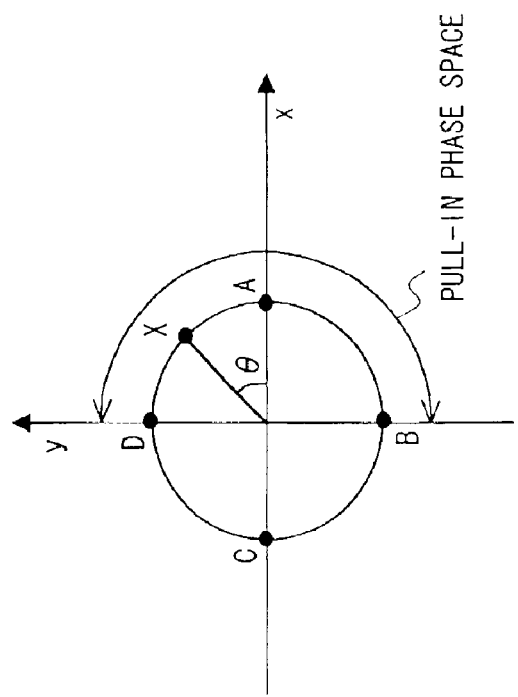

As having been described in FIGS. 1A and 1B, even if a synchronizing signal of a low speed such as 600 Hz is extracted by the arrangement of FIG. 9 or FIG. 18, the pull-in phase space is narrow, so that the stable establishment of synchronization cannot be obtained. According to the arrangement of FIG. 15, it is made possible to enlarge the pull-in phase space, thereby enabling the establishment of the stable synchronization.

Namely, in FIG. 15, the power calculator 231 calculates the power value of the output signal of the cos role-off filter 70, and the 90° phase shifter 234 provides the power values whose phases are different from each other by 90 degrees respectively to the LPF's 235 and 236 for summing up the power values within a fixed section. The summation of the power values whose phases are different from each other by 90 degrees outputted from the LPF's 235 and 236 are added by the vectorizing circuit 233 for vectorization.

The above-mentioned vectorization will be described referring to FIGS. 16A–16D. FIG. 16A shows a frame synchronizing signal of 600 Hz, and FIG. 16B shows an example of inserting zero-points of 20 symbols for data of 620 symbols.

In this case, since the power value of the reception signal outputted by the power calculator 231 is as shown in FIG. 16C, when the outputs of the LPF's 235 and 236 are respectively indicated by reference characters "a" and "b", the reference characters "a" and "b" are made to indicate respective summations of the power values of the sections whose phases are different from each other by 90 degrees, so that states S1–S6 shown in FIG. 16C are repeated.

In order to simplify the description, the section for summing the power values are made equal to that of the zero-points of 20 symbols, and it is assumed that the phase difference of 90 degrees between "a" and "b" corresponds to 10 symbols. Also, the maximum value of areas (summation of power value) of "a" and "b" is assumed to be "1".

In this case, (a, b) respectively assumes (1, 1) in the state S1 (or S6), (1, 0.5) in the state S2, (0.5, 0) in the state S3, (0, 0.5) in the state S4, and (0.5, 1) in the state S5.

When this is indicated by (x, y)=(a, b) on xy coordinates, as shown in FIG. 16D, the point (x, y)=(a, b) remains for a long time in the state S1 (or S6) and moves in the states S2–S5 before and after the zero-point insertion.

Thus, the changes before and after the section where the zero-points are inserted appear prominent in the states S2–S5. This means that the narrow pull-in phase space shown in FIG. 1B is enlarged. Therefore, by comparing the output of the vectorizing circuit 233 with the predetermined reference point at the comparator 241, the phase difference θ is extracted, so that it is made possible to establish the synchronization in the same way as the embodiment (1).

In case of this embodiment, it is required that a point other than (x, y)=(1, 1) where there is no state change is used for the reference point.

It is to be noted that it is possible to vectorize not the summation value of the power values but the output itself of the power calculator with the power value whose phase is different therefrom by 90 degrees without using the LPF's 235 and 236. In this case, while the processing speed is enhanced, it is made vulnerable to variations. Since integration is effected by using the LPF's 235 and 236, while the processing speed is low, it is made resistant to variations and stabilized.

As described above, a synchronization method and apparatus according to the present intention are arranged so that a periodic amplitude modulation is applied, or a zero-point is inserted, as a synchronizing signal to a transmission signal point on a transmission side at a preceding stage of a transparent transmission line. Therefore, it becomes possible to establish synchronization on a reception side even in case a transmission of a specific frequency is not guaranteed.

Also, a synchronization method and apparatus according to the present invention are arranged so that in case of a frame synchronization, a power value of a received signal is calculated on the reception side of the above-mentioned transparent transmission line, and the synchronizing signal is vectorized using the power values whose phases are different from each other by 90 degrees on a time axis. Therefore, it is made possible to expand a pull-in phase space of the synchronizing signal even in case where a frequency of the synchronizing signal is extremely low compared with a modulation speed, thereby establishing a stable synchronization.

What we claim is:

1. A synchronization method for generating a synchronizing signal comprising the steps of:
   providing a transmission signal;
   applying a periodic amplitude modulation to a transmission signal point on a transmission side of a transparent transmission line, thereby generating the synchronizing signal;
   calculating a power value of a received signal on reception side of the transparent transmission line; and
   extracting the synchronizing signal included in the received signal using the power value.

2. The synchronization method as claimed in claim 1, wherein the synchronizing signal comprises a timing synchronizing signal.

3. The synchronization method as claimed in claim 1 wherein the synchronizing signal comprises a frame synchronizing signal.

4. The synchronization method as claimed in claim 3 wherein the amplitude modulation is applied after separating frames into relatively long and short sections.

5. The synchronization method as claimed in claim 1 further comprising the step of providing cos roll-off filtering prior to the power value calculation step.

6. A synchronization method comprising the steps
   providing a transmission signal; and
   applying a periodic amplitude modulation to a transmission signal point on a transmission side of a transparent transmission line, thereby generating the synchronizing signal
   wherein a power ratio of the amplitude modulation comprises an internal ratio.

7. A synchronization method for generating a frame synchronizing signal comprising the steps of:
   providing a transmission signal;
   applying a periodic amplitude modulation to a transmission signal point on a transmission side of a transparent transmission line, thereby generating the synchronizing signal;
   calculating a power value of a received signal on a reception side of the transparent transmission line; and vectonzing the synchronizing signal using the power values whose phases are different from each other by 90 degrees on a time axis.

wherein the amplitude modulation is applied after separating frames into relatively long and short sections.

8. The synchronization method as claimed in claim 7 further comprising the step of providing cos roll-off filtering prior to the power value calculation step.

9. A synchronization apparatus comprising:

a transparent transmission line;

means for generating a synchronizing signal by applying a periodic amplitude modulation to a transmission signal point on a transmission side of the transparent transmission lines;

means for calculating a power value of a received signal on a reception side of the transparent transmission line; and means for extracting the synchronizing signal included in the received signal by using the power value.

10. The synchronization apparatus as claimed in claim 9 wherein the synchronizing signal comprises a timing synchronizing signal.

11. The synchronization apparatus as claimed in claim 9 wherein the synchronizing signal comprises a frame synchronizing signal.

12. The synchronization apparatus as claimed in claim 11 wherein the amplitude modulation is applied after separating frames into relatively long and short sections.

13. The synchronization apparatus as claimed in claim 9, further comprising a cos roll-off filter, the power value calculating means calculating the power value of the received signal having passed through the cos roll-off filter.

14. A synchronization apparatus a transparent transmission line; and means for generating a synchronizing signal by applying a periodic amplitude modulation to a transmission signal point on a transmission side of the transparent transmission line.

wherein a power ratio of the amplitude modulation comprises an integral ratio.

15. A synchronization apparatus comprising:

a transparent transmission line;

means for generating a frame synchronizing signal by applying a periodic amplitude modulation to a transmission signal point on a transmission side of the transparent transmission line;

means for calculating a power value of a received signal on a reception side of the transparent transmission line; and means for vectonzing the synchronizing signal using the power values whose phases are different from each other by 90 degrees on a time axis, wherein the amplitude modulation is applied after separating frames into relatively long and short sections.

16. The synchronization apparatus as claimed an claim 15, further comprising a cos roll-off filter, the power value calculating means calculating the power value of the received signal having passed through the cos roll-off filter.

17. A synchronization method for generating a frame synchronizing signal comprising the steps of:

providing a transmission signal;

periodically inserting a zero-point into a transmission signal point on a transmission side at a preceding stage of a transparent transmission line, thereby generating a synchronizing signal;

calculating a power value of a received signal on a reception side of the transparent transmission line; and vectorizing the synchronizing signal using the power values whose phases are different from each other by 90 degrees on a time axis, wherein one or more zero-points are inserted at intervals of signal points of an integer number.

18. The synchronization method as claimed in claim 17 further comprising the step of providing cos roll-off filtering prior to the power value calculation step.

19. A synchronization apparatus comprising:

a transparent transmission line;

means for generation a frame synchronizing signal by periodically inserting a zero-point into a transmission signal point on a transmission side at a preceding state of the transparent line;

means for calculating a power value of a received signal on a reception side of the transparent transmission line; and means for vectorizing the synchronizing signal using the power values whose phases are different from each other by 90 degrees on a time axis, wherein one or more zero-points are inserted at interval of signal points of an integer number.

20. The synchronization apparatus as claimed in claim 19, further comprising a cos roll-off filter, the power value calculating means calculating the power value of the received signal having passed through the cos roll-off filter.

21. A synchronization method comprising the steps of;

receiving a signal having a first frequency generated by applying a periodic amplitude modulation;

calculating a power value of a received signal; and extracting a timing synchronizing signal include in the received signal from the power value with a band pass filter having a center frequency of a second frequency which is lower than the first frequency of the signal.

22. A synchronizing apparatus comprising:

means for receiving a signal having a first frequency generated by applying a periodic amplitude modulation;

means for calculating a power value of a received signal; and means for extracting a timing synchronizing signal included in the received signal from the power value with a band pass filter having a center frequency of a second frequency which is lower than the first frequency of the signal.

* * * * *